United States Patent
Ferguson et al.

(10) Patent No.: US 11,830,058 B2
(45) Date of Patent: Nov. 28, 2023

(54) AUTOMATED RETAIL STORE ON AUTONOMOUS OR SEMI-AUTONOMOUS VEHICLE

(71) Applicant: Nuro, Inc., Mountain View, CA (US)

(72) Inventors: David Ferguson, San Francisco, CA (US); Jiajun Zhu, Palo Alto, CA (US); Pichayut Jirapinyo, San Francisco, CA (US); Nan Ransohoff, San Francisco, CA (US)

(73) Assignee: Nuro, Inc., Mountain View, CA (US)

( * ) Notice: Subject to any disclaimer, the term of this patent is extended or adjusted under 35 U.S.C. 154(b) by 209 days.

(21) Appl. No.: 17/561,013

(22) Filed: Dec. 23, 2021

(65) Prior Publication Data

US 2022/0114645 A1 Apr. 14, 2022

Related U.S. Application Data

(63) Continuation of application No. 16/046,980, filed on Jul. 26, 2018, now abandoned.
(Continued)

(51) Int. Cl.
*G06Q 30/0601* (2023.01)
*B60P 3/00* (2006.01)
(Continued)

(52) U.S. Cl.
CPC ............ *G06Q 30/0631* (2013.01); *A23L 2/52* (2013.01); *A23L 5/00* (2016.08); *A23L 7/109* (2016.08);
(Continued)

(58) Field of Classification Search
CPC ............ G06Q 10/087; G06Q 30/0601; G06Q 30/0603; G06Q 30/06; G06Q 30/0641;
(Continued)

(56) References Cited

U.S. PATENT DOCUMENTS

| | | | | |
|---|---|---|---|---|
| 5,207,784 A | * | 5/1993 | Schwartzendruber | .. G07F 9/026 221/6 |
| 5,844,808 A | * | 12/1998 | Konsmo | ................. G07F 9/026 379/93.31 |

(Continued)

FOREIGN PATENT DOCUMENTS

| | | |
|---|---|---|
| CN | 101783004 A | 7/2010 |
| CN | 105453124 A | 3/2016 |

(Continued)

OTHER PUBLICATIONS

Ridden, Paul, Self-driving pod delivers groceries to online supermarket customers Automotive, Jun. 28, 2017 (Year: 2017).*

(Continued)

*Primary Examiner* — Scott L Jarrett

(57) ABSTRACT

An autonomous or semi-autonomous vehicle fleet comprising a plurality of autonomous or semi-autonomous vehicles for providing an assortment of items to a customer or a potential customer after such customer or potential customer summons the one or more autonomous or semi-autonomous vehicles in an unstructured open or closed environment. Each autonomous or semi-autonomous vehicle comprises one or more compartments configured to contain and secure the assortment of the items to be selected once the summoned autonomous or semi-autonomous vehicle arrives to a customer or potential customer.

20 Claims, 18 Drawing Sheets

Related U.S. Application Data

(60) Provisional application No. 62/538,538, filed on Jul. 28, 2017.

(51) Int. Cl.

| | | |
|---|---|---|
| G05D 1/00 | (2006.01) | |
| G06Q 10/0631 | (2023.01) | |
| G06Q 10/083 | (2023.01) | |
| G06Q 50/12 | (2012.01) | |
| G06Q 50/28 | (2012.01) | |
| G06Q 10/08 | (2023.01) | |
| G08G 1/04 | (2006.01) | |
| B60R 21/34 | (2011.01) | |
| B65G 67/24 | (2006.01) | |
| G01C 21/34 | (2006.01) | |
| G05D 1/02 | (2020.01) | |
| G05D 1/12 | (2006.01) | |
| G06K 7/10 | (2006.01) | |
| G08G 1/00 | (2006.01) | |
| H04L 67/12 | (2022.01) | |
| G06N 20/00 | (2019.01) | |
| B60R 25/25 | (2013.01) | |
| A23L 5/00 | (2016.01) | |
| A23L 7/109 | (2016.01) | |
| G06F 16/955 | (2019.01) | |
| A23L 2/52 | (2006.01) | |
| A47J 37/06 | (2006.01) | |
| A47J 47/00 | (2006.01) | |
| B60H 1/00 | (2006.01) | |
| B60P 1/36 | (2006.01) | |
| B60P 3/025 | (2006.01) | |
| B60R 19/18 | (2006.01) | |
| G06K 7/14 | (2006.01) | |
| G06K 19/06 | (2006.01) | |
| G06Q 10/0635 | (2023.01) | |
| G06Q 10/0832 | (2023.01) | |
| G06Q 10/0833 | (2023.01) | |
| G06Q 10/0834 | (2023.01) | |
| G06Q 10/0835 | (2023.01) | |
| G06Q 10/0837 | (2023.01) | |
| G06Q 20/00 | (2012.01) | |
| G06Q 20/12 | (2012.01) | |
| G06Q 20/18 | (2012.01) | |
| G06Q 30/0645 | (2023.01) | |
| G07F 17/00 | (2006.01) | |
| G07F 17/12 | (2006.01) | |
| G07C 5/02 | (2006.01) | |
| G07C 5/08 | (2006.01) | |
| G06V 20/56 | (2022.01) | |
| G06V 20/64 | (2022.01) | |
| G06Q 30/0251 | (2023.01) | |
| G06Q 50/30 | (2012.01) | |
| G06K 19/07 | (2006.01) | |
| H04W 4/024 | (2018.01) | |
| H04W 4/40 | (2018.01) | |
| G01C 21/20 | (2006.01) | |
| B60R 19/48 | (2006.01) | |
| G06F 3/0484 | (2022.01) | |
| B60R 21/36 | (2011.01) | |
| H04N 5/76 | (2006.01) | |
| H05B 6/68 | (2006.01) | |

(52) U.S. Cl.
CPC ........... *A47J 37/0658* (2013.01); *A47J 47/00* (2013.01); *B60H 1/00364* (2013.01); *B60H 1/00735* (2013.01); *B60P 1/36* (2013.01); *B60P 3/007* (2013.01); *B60P 3/0257* (2013.01); *B60R 19/18* (2013.01); *B60R 19/483* (2013.01); *B60R 21/34* (2013.01); *B60R 25/25* (2013.01); *B60R 25/252* (2013.01); *B65G 67/24* (2013.01); *G01C 21/20* (2013.01); *G01C 21/343* (2013.01); *G01C 21/3438* (2013.01); *G01C 21/3453* (2013.01); *G05D 1/0027* (2013.01); *G05D 1/0033* (2013.01); *G05D 1/0038* (2013.01); *G05D 1/0061* (2013.01); *G05D 1/0088* (2013.01); *G05D 1/0094* (2013.01); *G05D 1/0212* (2013.01); *G05D 1/0214* (2013.01); *G05D 1/0223* (2013.01); *G05D 1/0231* (2013.01); *G05D 1/0276* (2013.01); *G05D 1/0291* (2013.01); *G05D 1/12* (2013.01); *G06F 16/955* (2019.01); *G06K 7/10297* (2013.01); *G06K 7/10722* (2013.01); *G06K 7/1413* (2013.01); *G06K 19/06028* (2013.01); *G06K 19/0723* (2013.01); *G06N 20/00* (2019.01); *G06Q 10/0631* (2013.01); *G06Q 10/0635* (2013.01); *G06Q 10/06315* (2013.01); *G06Q 10/08* (2013.01); *G06Q 10/083* (2013.01); *G06Q 10/0832* (2013.01); *G06Q 10/0833* (2013.01); *G06Q 10/0834* (2013.01); *G06Q 10/0835* (2013.01); *G06Q 10/0837* (2013.01); *G06Q 10/08355* (2013.01); *G06Q 20/00* (2013.01); *G06Q 20/127* (2013.01); *G06Q 20/18* (2013.01); *G06Q 30/0265* (2013.01); *G06Q 30/0266* (2013.01); *G06Q 30/0645* (2013.01); *G06Q 50/12* (2013.01); *G06Q 50/28* (2013.01); *G06Q 50/30* (2013.01); *G06V 20/56* (2022.01); *G06V 20/64* (2022.01); *G07C 5/02* (2013.01); *G07C 5/08* (2013.01); *G07F 17/0057* (2013.01); *G07F 17/12* (2013.01); *G08G 1/04* (2013.01); *G08G 1/202* (2013.01); *H04L 67/12* (2013.01); *H04W 4/024* (2018.02); *H04W 4/40* (2018.02); *A23V 2002/00* (2013.01); *B60R 21/36* (2013.01); *B60R 2021/346* (2013.01); *B65G 2209/06* (2013.01); *G05D 2201/0207* (2013.01); *G05D 2201/0213* (2013.01); *G06F 3/0484* (2013.01); *G08G 1/22* (2013.01); *H04N 5/76* (2013.01); *H05B 6/688* (2013.01)

(58) Field of Classification Search
CPC ........... G06Q 30/0639; G06Q 10/0836; G06Q 20/203; G06Q 10/08; G06Q 20/127; G06Q 20/20; G06Q 20/18; G06Q 50/28; G06Q 30/0631; G06Q 10/083; B64U 2101/60; B64U 2101/64; B60P 3/20; B60P 1/00; B60P 3/007
See application file for complete search history.

(56) References Cited

U.S. PATENT DOCUMENTS

| | | | | |
|---|---|---|---|---|
| 6,021,394 A | * | 2/2000 | Takahashi | G06Q 30/0202 |
| | | | | 235/375 |
| 6,181,981 B1 | * | 1/2001 | Varga | G07F 9/026 |
| | | | | 700/244 |
| 6,571,150 B2 | * | 5/2003 | Arai | G07F 5/18 |
| | | | | 700/241 |
| 8,191,779 B2 | * | 6/2012 | Illingworth | G06Q 30/0619 |
| | | | | 700/231 |
| 8,326,707 B2 | * | 12/2012 | Fan | G06Q 10/087 |
| | | | | 235/382 |

(56) References Cited

U.S. PATENT DOCUMENTS

| | | | |
|---|---|---|---|
| 8,788,341 B1* | 7/2014 | Patel | G07F 9/001 700/231 |
| 8,844,994 B2* | 9/2014 | White | B60P 3/0257 296/22 |
| 8,862,388 B2* | 10/2014 | Wu | G06Q 10/02 701/425 |
| 9,008,890 B1 | 4/2015 | Herbach et al. | |
| 9,230,236 B2* | 1/2016 | Villamar | G06Q 10/087 |
| 9,256,852 B1* | 2/2016 | Myllymaki | G06Q 10/083 |
| 9,489,490 B1* | 11/2016 | Theobald | G16H 20/13 |
| 9,535,421 B1* | 1/2017 | Canoso | G05D 1/0248 |
| 9,552,564 B1* | 1/2017 | Martenis | G07C 9/00571 |
| 9,741,010 B1* | 8/2017 | Heinla | G06Q 10/083 |
| 9,741,011 B2 | 8/2017 | Beach-Drummond | |
| 9,911,048 B2* | 3/2018 | Jones | H04N 7/183 |
| 9,984,525 B2* | 5/2018 | Will | G07F 11/44 |
| 10,120,384 B2* | 11/2018 | Wilkinson | G05D 1/02 |
| 10,227,178 B2* | 3/2019 | High | B60P 3/007 |
| 10,235,651 B2* | 3/2019 | Winkle | G06Q 10/0836 |
| 10,331,124 B2* | 6/2019 | Ferguson | G05D 1/0297 |
| 10,414,344 B1 | 9/2019 | Northcott et al. | |
| 10,467,581 B2* | 11/2019 | Laury | G01C 21/343 |
| 10,486,640 B2 | 11/2019 | Ferguson et al. | |
| 10,532,885 B1* | 1/2020 | Brady | G06Q 10/083 |
| 10,538,190 B1* | 1/2020 | Metellus | B60F 5/02 |
| 10,624,484 B1* | 4/2020 | Mountford | B60P 3/03 |
| 10,654,394 B2* | 5/2020 | Goldberg | G07C 9/00182 |
| 10,796,271 B2 | 10/2020 | Beach-Drummond | |
| 10,796,272 B2 | 10/2020 | Beach-Drummond | |
| 10,885,492 B2* | 1/2021 | Goldberg | G06Q 10/087 |
| 10,919,429 B2* | 2/2021 | Cole | B60P 3/0257 |
| 11,009,868 B2* | 5/2021 | Ferguson | G08G 1/0145 |
| 11,222,378 B2 | 1/2022 | Ferguson et al. | |
| 11,447,055 B2 | 9/2022 | Kanitz | |
| 11,449,050 B2 | 9/2022 | Ferguson et al. | |
| 11,518,291 B2* | 12/2022 | Buttolo | B60J 5/0491 |
| 2003/0209375 A1* | 11/2003 | Suzuki | B60L 58/25 180/68.5 |
| 2004/0144128 A1 | 7/2004 | Junge et al. | |
| 2004/0256872 A1* | 12/2004 | Piper | B60P 3/0257 296/24.36 |
| 2005/0043011 A1* | 2/2005 | Murray | H04W 68/00 455/403 |
| 2006/0049198 A1* | 3/2006 | Guard | B60P 3/0257 221/24 |
| 2007/0050082 A1* | 3/2007 | Yoshizaki | G07F 9/002 700/236 |
| 2007/0182818 A1* | 8/2007 | Buehler | G08B 13/19641 348/143 |
| 2007/0235465 A1* | 10/2007 | Walker | G07F 9/001 221/9 |
| 2011/0313811 A1* | 12/2011 | Urban | G06Q 20/203 296/24.3 |
| 2012/0059729 A1* | 3/2012 | Roa | G06Q 30/0601 705/26.1 |
| 2012/0130761 A1* | 5/2012 | Mohan | G06Q 10/0631 705/7.12 |
| 2014/0095350 A1* | 4/2014 | Carr | G06Q 30/0603 705/26.8 |
| 2014/0136414 A1* | 5/2014 | Abhyanker | G05D 1/0011 701/25 |
| 2014/0209634 A1* | 7/2014 | Metropulos | B67D 1/0041 222/608 |
| 2014/0330739 A1* | 11/2014 | Falcone | G06Q 10/08355 705/338 |
| 2014/0350952 A1* | 11/2014 | Utech | G16H 40/20 705/2 |
| 2015/0006005 A1* | 1/2015 | Yu | B60P 3/007 701/22 |
| 2015/0202770 A1 | 7/2015 | Patron et al. | |
| 2015/0356665 A1* | 12/2015 | Colson | G06Q 30/0635 705/26.81 |
| 2016/0066732 A1* | 3/2016 | Sarvestani | A47G 29/141 232/24 |
| 2016/0071052 A1* | 3/2016 | Henry | H04B 5/0062 235/380 |
| 2016/0239803 A1 | 8/2016 | Borley et al. | |
| 2016/0300187 A1 | 10/2016 | Kashi et al. | |
| 2017/0011580 A1* | 1/2017 | Huang | G06Q 10/30 |
| 2017/0123421 A1 | 5/2017 | Kentley et al. | |
| 2017/0124547 A1* | 5/2017 | Natarajan | G06Q 20/202 |
| 2017/0308852 A1* | 10/2017 | Beach-Drummond | G06Q 30/0633 |
| 2018/0024554 A1* | 1/2018 | Brady | G06Q 10/0833 701/23 |
| 2018/0053369 A1* | 2/2018 | High | G07F 9/0235 |
| 2018/0082343 A1* | 3/2018 | Gordon | B60G 17/0165 |
| 2018/0099602 A1* | 4/2018 | Salter | B60Q 1/507 |
| 2018/0118078 A1* | 5/2018 | Alkhaldi | B60P 3/0257 |
| 2018/0158018 A1* | 6/2018 | Luckay | G05D 1/0027 |
| 2018/0189716 A1* | 7/2018 | Crone | G06Q 10/083 |
| 2018/0189725 A1* | 7/2018 | Mattingly | G06K 19/0723 |
| 2018/0194411 A1* | 7/2018 | Liivik | G05D 1/021 |
| 2018/0031296 A1 | 8/2018 | Winkle et al. | |
| 2018/0232839 A1* | 8/2018 | Heinla | G05D 1/0282 |
| 2018/0246526 A1* | 8/2018 | Wilkinson | G08B 21/182 |
| 2018/0253108 A1* | 9/2018 | Heinla | G06T 7/73 |
| 2018/0260778 A1* | 9/2018 | Mazetti | G01C 21/206 |
| 2018/0260780 A1* | 9/2018 | Mazetti | G06Q 10/08355 |
| 2018/0282014 A1 | 10/2018 | Atchley et al. | |
| 2018/0300676 A1* | 10/2018 | Peterson | B60Q 1/507 |
| 2018/0330313 A1* | 11/2018 | Clarke | B64F 1/32 |
| 2018/0349872 A1* | 12/2018 | Ahmed | G06Q 20/20 |
| 2018/0356823 A1 | 12/2018 | Cooper | |
| 2018/0365668 A1* | 12/2018 | Hay | G06Q 20/20 |
| 2019/0035044 A1* | 1/2019 | Ferguson | G05D 1/0231 |
| 2020/0372465 A1 | 11/2020 | Beach-Drummond | |
| 2022/0207505 A1* | 6/2022 | Ahmed | G06Q 20/18 |

FOREIGN PATENT DOCUMENTS

| | | |
|---|---|---|
| CN | 106327227 A | 1/2017 |
| CN | 106663273 A | 5/2017 |
| JP | H1179331 A | 3/1999 |
| WO | 2013119942 A1 | 8/2013 |
| WO | 2015150846 A2 | 10/2015 |
| WO | 2016183525 A1 | 11/2016 |

OTHER PUBLICATIONS

Peters, Adele, The Grocery Store Of The Future Is Mobile, Self-Driving and Run By AI Fast Company, Jun. 13, 2017 (Year: 2017).*

McQuarrie, Laura, Online Grocery Store is Testing CargoPods for Delivery Autos, Jun. 29, 2017 (Year: 2017).*

Hofbauer, Randy, Kroger Pilots Autonomous Online Grocery Delivery Progressive Grocer, Jun. 27, 2018 (Year: 2018).*

Lynn, Bryan, 5 Driverless Robots for Transporting Food and More VOA, Jul. 20, 2017 (Year: 2017).*

* cited by examiner

AUTOMATED RETAIL STORE ON AUTONOMOUS OR SEMI-AUTONOMOUS VEHICLE

CROSS REFERENCE

This application is a continuation of U.S. patent application Ser. No. 16/046,980, filed on Jul. 26, 2018, and titled "AUTOMATED RETAIL STORE ON AUTONOMOUS OR SEMI-AUTONOMOUS VEHICLE," which claims priority to U.S. Provisional Application No. 62/538,538, filed on Jul. 28, 2017; the aforementioned priority applications being hereby incorporated by reference in their respective entireties.

BACKGROUND OF THE INVENTION

The field of autonomous and semi-autonomous vehicles is a growing field of innovation. Vehicles are being used for many purposes including warehouse inventory operations, household operations, hospital deliveries, sanitation, and military or defense applications.

SUMMARY OF THE INVENTION

This disclosure relates to an autonomous and/or semi-autonomous vehicle fleet comprising a plurality of vehicles, in particular vehicles for transporting or retrieving deliveries in either unstructured outdoor environment or closed environments.

One aspect provided herein is an autonomous or semi-autonomous platform for positioning a plurality of autonomous or semi-autonomous vehicles and displaying a plurality of items, the platform comprising: the plurality of autonomous or semi-autonomous vehicles, each vehicle comprising: a compartment configured to contain and secure two or more of the plurality of items; an input device configured to receive an input data corresponding to a customer; a communication device; and an autonomous or semi-autonomous propulsion system; and a server processor configured to provide a server application comprising: a data storage module containing a plurality of locations comprising at least one inventory restocking location and a plurality of dispatch locations, wherein each dispatch location is associated with a demand; a status module receiving a stock indication of each of the items and a current vehicle location from the communication device of one or more of the vehicles; and a fleet management module directing the autonomous or semi-autonomous propulsion system of one or more of the vehicles, via the communication device, to one of the plurality of dispatch locations or the inventory restocking location based at least on one or more of the demand, the stock indication, and the current vehicle location; and the platform further comprising a summoning processor configured to provide a summoning application comprising a summon module receiving a summons from the customer, the summons comprising at least a customer location, wherein the summon module further directs the autonomous or semi-autonomous propulsion system of one or more of the vehicles, via the communication device, to the customer location;

In some embodiments, the summoning processor further comprises an identification module identifying the customer based at least on the input data. In some embodiments, the summoning processor further comprises a compartment module allowing the customer to access and remove one or more of the items from the compartment based at least on the identity of the customer and the summons. In some embodiments, the compartment comprises a sensor configured to detect an item status of one or more of the items. In some embodiments, the communication device is further configured to transmit the item status to the status module, and wherein the status module further applies a product detection algorithm to the item status to detect an absence of one or more of the items. In some embodiments, the product detection algorithm comprises a machine learning algorithm, a rule-based algorithm, or both. In some embodiments, each vehicle further comprises a product detection processor configured to provide a product detection application comprising a product detection module applying a product detection algorithm to the item status to detect an absence of one or more of the items. In some embodiments, the product detection algorithm comprises a machine learning algorithm, a rule-based algorithm, or both. In some embodiments, the compartment comprises an item emitting mechanism configured to emit the items within the compartment. In some embodiments, each vehicle further comprises an interface configured to receive a selection of the item and to direct the item emitting mechanism to emit at least one of the items based on the selection In some embodiments, the communication device is further configured to receive a selection of the item and transmit an instruction to the emitting mechanism to emit at least one of the items based on the selection. In some embodiments, the summons module further receives the stock indication and displays the stock indication to the customer. In some embodiments, each dispatch location in the data storage module is further associated with at least one of a current customer density, a historic customer density, a time-based customer density. In some embodiments, at least one of the server application and the summoning application further comprises a payment module managing payment from the customer for the item. In some embodiments, an input device configured to receive a payment from the customer for the item. In some embodiments, each vehicle further comprises an energy storage device configured to provide power to the autonomous or semi-autonomous propulsion system. In some embodiments, the status module further receives a power status associated with the energy storage device, and wherein the fleet management module further directs the autonomous or semi-autonomous propulsion system of one or more of the vehicles based on the power status. In some embodiments, the data storage module further contains a customer identification associated with the customer, and wherein the compartment module further allows the customer to access and remove one or more of the items from the compartment based on the customer identification. In some embodiments, the input data comprises the customer identification. In some embodiments, the sensor comprises at least one of a thermometer, a barcode scanner, an RFID reader, a scale, a pressure sensor, a switch, and a camera. In some embodiments, the input device comprises a button, a touchscreen, a Bluetooth sensor, a wireless network device, a cellular network device, a camera, a USB input, a keyboard, or any combination thereof. In some embodiments, the input data comprises a password, a key code, a facial recognition, a RFID recognition, a barcode recognition, a USB device input, a vocal signal, or any combination thereof.

Another aspect provided herein is an autonomous vehicle for providing an assortment of items to a customer, the autonomous vehicle comprising: a locking compartment configured to contain and secure the assortment of the items, the compartment comprising a sensor configured to detect a presence of each of the items; an input device configured to receive an input data; a communication device; an autonomous propulsion system; and a non-transitory computer-readable storage media encoded with a computer program including instructions executable by a processor to create an application comprising: an order module configured to receive an order for at least one of the items by the customer, wherein the order comprises a location of the customer; a prediction module configured to determine an optimal display location; a navigation module controlling the autonomous propulsion system to direct the autonomous vehicle to: the customer location, if the order is received and if the customer location is inequivalent to a current location of the autonomous vehicle; or the display location, if the order is not received; an identification module identifying the customer based at least on the input data; a compartment module unlocking the compartment based at least on the identity of the customer; a confirmation module determining that the item has been removed from the compartment based at least on the detection of the presence of the item; and a purchase module communicating the removal of the item and the input data via the communication device.

In some embodiments, the prediction module is configured to determine the optimal display location by a machine learning algorithm. In some embodiments, the compartment is configured to contain, and secure 2 or more of the items. In some embodiments, the item comprises an indicator. In some embodiments, the sensor is configured to sense the presence of the item by sensing the indicator. In some embodiments, the sensor comprises at least one of a thermometer, a barcode scanner, an RFID reader, a scale, a pressure sensor, a switch, and a camera. In some embodiments, the input device comprises a button, a touchscreen, a Bluetooth sensor, a wireless network device, acellular network device, a camera, a USB input, a keyboard, or any combination thereof. In some embodiments, the input data comprises a password, a key code, a facial recognition, a RFID recognition, a barcode recognition, a USB device input, a vocal signal, or any combination thereof. In some embodiments, the order module is configured to receive an order via the communication device. In some embodiments, the communication device is configured to receive an instruction from a fleet management module. In some embodiments, the purchase module communicates the removal of the item and the input data to a fleet management module. In some embodiments, the application further comprises a billing module charging the customer based at least on the removal of the item. In some embodiments, the autonomous vehicle further comprises at least one of an energy storage device, and an energy collection device. In some embodiments, the autonomous vehicle further comprises a screen configured to display a media.

Another aspect provided herein is a vehicle fleet comprising a plurality of autonomous vehicles operating autonomously and/or semi-autonomously and a fleet management module, associated with a central server for coordination of the autonomous vehicle fleet; the fleet management module configured to coordinate the activity and positioning of each autonomous vehicle in the fleet, wherein the fleet is configured for transporting, delivering or retrieving goods or services and capable of operating in an unstructured open or closed environments; each autonomous vehicle in the fleet comprising: a power system, a conveyance system; (e.g., a drive system with a propulsion engine, wheels, treads, wings, rotors, blowers, rockets, propellers, brakes, etc.); a navigation module for navigation in the unstructured open or closed environments; (e.g., digital maps, HD maps, GPS); a communication module configurable to receive, store and send data to the fleet management module, a user, and the autonomous vehicles in the fleet, related to at least; user interactions and the autonomous vehicle fleet interactions, comprising: scheduled requests or orders, on-demand requests or orders, or a need for self-positioning of the autonomous vehicle fleet based on anticipated demand within the unstructured open or closed environments; a sensor system, at least one securable compartment or a plurality of securable compartments to hold said goods or items associated with said services; and a controller configurable to associate each one of the at least one or plurality of securable compartments to an assignable customer, or customer group in a marketplace, or provider and provide entry when authorized; at least one processor configured to manage the conveyance system, the navigation module, the sensor system, instructions from the fleet management module, the communication module, and the controller.

In some embodiments, the unstructured open environment is a non-confined geographic region accessible by navigable pathways comprising: public roads; private roads; bike paths; open fields; open public lands; open private lands; pedestrian walkways; lakes; rivers; streams; or open airspace.

In some embodiments, the closed environment is a confined, enclosed or semi-enclosed structure accessible by navigable pathways comprising: open areas or rooms within commercial architecture, with or without structures or obstacles therein; airspace within open areas or rooms within commercial architecture, with or without structures or obstacles therein; public or dedicated aisles; hallways; tunnels; ramps; elevators; conveyors; or pedestrian walkways.

In some embodiments, the navigation module controls routing of the conveyance system of the autonomous vehicles in the fleet in the unstructured open or closed environments.

In some embodiments, the communication to the user, to the autonomous vehicles in the fleet, between the autonomous vehicles of the fleet, and between the user and the autonomous vehicles in the fleet, occurs via wireless transmission.

In some embodiments, the user comprises a fleet manager; a sub-contracting vendor; a service provider; a customer; a business entity; an individual; or a third party. In some embodiments, the user's wireless transmission interactions and the autonomous vehicle fleet wireless transmission interactions occur via mobile application transmitted by an electronic device and forwarded to the communication module via: a central server; a fleet management module; and/or a mesh network.

In some embodiments, the electronic device comprises: a phone; a personal mobile device; a personal digital assistant (PDA); a mainframe computer; a desktop computer; a laptop computer; a tablet computer; and/or wearable computing device comprising: a communication headset; smart glasses; a contact lens or lenses; a digital watch; a bracelet; a ring; jewelry; or a combination thereof.

In some embodiments, each autonomous vehicle fleet is configured with a maximum speed range from 1.0 mph to 90.0 mph.

In some embodiments, the plurality of securable compartments are humidity and temperature controlled for: hot goods, cold goods, wet goods, dry goods, or combinations or variants thereof.

In some embodiments, the plurality of securable compartments are configurable for a plurality of goods. Such configurations and goods comprise: bookshelves for books; thin drawers for documents; larger box-like drawers for packages, and sized compartments for vending machines, coffee makers, pizza ovens and dispensers. In some embodiments, the plurality of securable compartments is variably configurable based on: anticipated demands; patterns of behaviors; area of service; or types of goods to be transported. In some embodiments, the services comprise: subscription services; prescription services; marketing services; advertising services; notification services; a mobile marketplace; or requested, ordered or scheduled delivery services. In particular embodiments, the scheduled delivery services include, by way of example, special repeat deliveries such as groceries, prescriptions, drinks, mail, documents, etc.

In some embodiments, the services further comprise: the user receiving and returning the same or similar goods within the same interaction; (e.g., signed documents); the user receiving one set of goods and returning a different set of goods within the same interaction; (e.g., product replacement/returns, groceries, merchandise, books, recording, videos, movies, payment transactions, etc.); a third party user providing instruction and or authorization to a goods or service provider to prepare, transport, deliver and/or retrieve goods to a principle user in a different location. In some embodiments, the services further comprise: general services, (e.g., picking up a user's dry cleaning, dropping off a user's dry cleaning, renting goods, (such as tools, DVDs, etc.), sharing/borrowing goods from other users or businesses, etc.). Further still, it may be a general pickup service for items to be shipped, returned, or sent to other users/businesses, etc.

In some embodiments, at least one autonomous vehicle in the fleet is further configured to process or manufacture goods. In some embodiments, the processed or manufactured goods comprise: beverages, etc., with or without condiments; (e.g., coffee, tea, carbonated drinks, etc.); a plurality of fast foods; or microwavable foods.

In some embodiments, the autonomous vehicle fleet further comprises at least one autonomous vehicle having a digital display for curated content comprising: advertisements (i.e., for both specific user and general public), including; services provided, marketing/promotion, regional/location of areas served, customer details, local environment, lost, sought or detected people, public service announcements, date, time, or weather.

In some embodiments of the autonomous vehicle fleet, the positioning of autonomous vehicles can be customized based on: anticipated use, a pattern of historical behaviors, or specific goods being carried. In some embodiments, the autonomous vehicle fleet is fully-autonomous.

In some embodiments, the autonomous vehicle fleet is semi-autonomous. In some embodiments, the autonomous vehicle fleet is controlled directly by the user. In some embodiments of the autonomous vehicle fleet, a plurality of said autonomous or semi-autonomous vehicles within the fleet is operated on behalf of third party vendor/service provider; (e.g., fleet managed by an owner, but providing a coffee service/experience for a third party vendor (i.e., Starbucks) with white label vehicles in the fleet). In some embodiments of the autonomous vehicle fleet, a plurality of said autonomous vehicles within the fleet is further configured to be part of a sub-fleet comprising a sub-plurality of autonomous vehicles, wherein each sub-fleet is configured to operate independently or in tandem with multiple sub-fleets comprising two or more sub-fleets.

INCORPORATION BY REFERENCE

All publications, patents, and patent applications mentioned in this specification are hereinincorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

This disclosure relates to an autonomous and/or semi-autonomous vehicle fleet comprising a plurality of autonomous vehicles, for transporting or retrieving deliveries in either open unstructured outdoor environments or closed environments.

Unlike present delivery services, methods, and systems, traditional stores are capable of safely and securely storing, displaying, and selling a wide number of items. Although workers in such stores prevent theft and product damage, such methods are expensive and inefficient during off hours. While some stores employ self-checkout machines to reduce such costs, human oversight is still required, and the inventory and sales are confined to the location of the store.

Although vending machines employ secure vending mechanisms to prevent theft, such devices are stationary, require a dedicated power outlet, and are not configured to allow a customer to feel or interact with an item before purchasing. Further such vending machines are not configured for returns or replacements.

As such, provided herein is an autonomous vehicle fleet comprising a plurality of autonomous vehicles operating autonomously or semi-autonomously and a fleet management module for coordination of the autonomous vehicle fleet, each autonomous vehicle within the fleet configured for transporting, delivering or retrieving goods or services and capable of operating in an unstructured open or closed environment, each autonomous vehicle comprising, a power system, a conveyance system, a navigation module, at least one securable compartment or a plurality of securable compartments to hold goods, a controller configurable to associate each of the securable compartments to an assignable customer a customer group within a marketplace, or provider and provide entry when authorized, a communication module and a processor configured to manage the conveyance system, the navigation module, the sensor system, the communication module and the controller.

Fleet of Autonomous Vehicles

Figure 1:
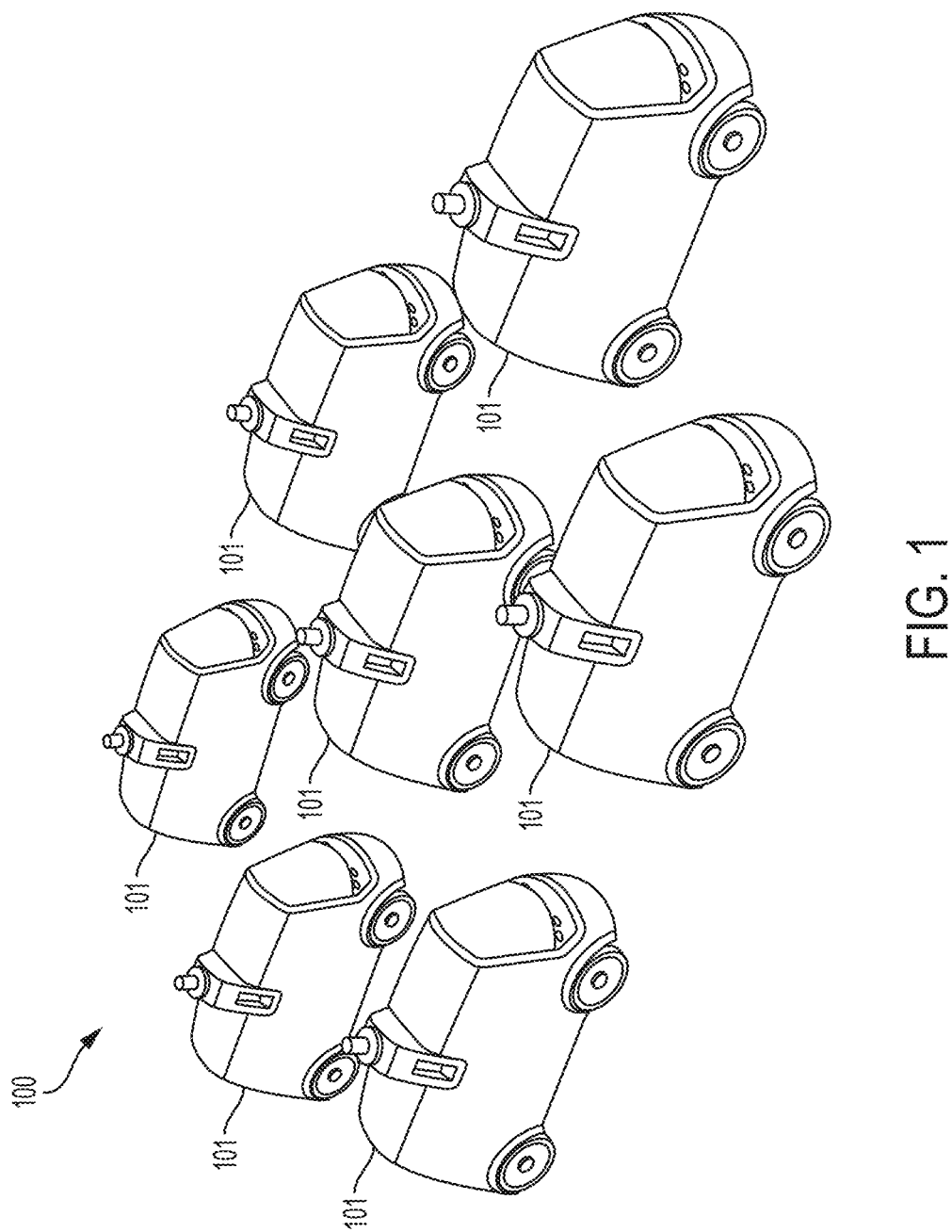
FIG. 1 is an illustration of an exemplary autonomous vehicle fleet, in accordance with someembodiments.
Figure 2:
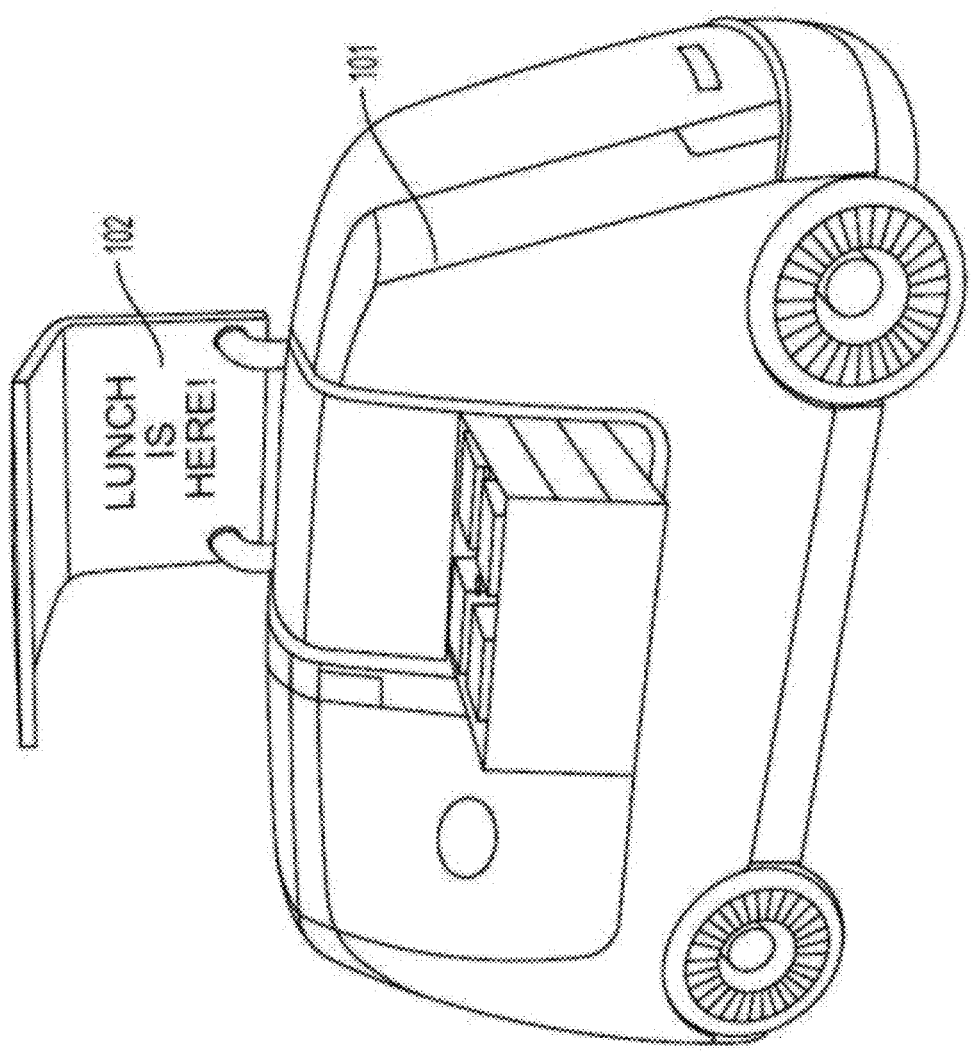
FIG. 2 is an perspective view of an exemplary autonomous vehicle comprising a plurality of compartments, in accordance with some embodiments.
Figure 3:
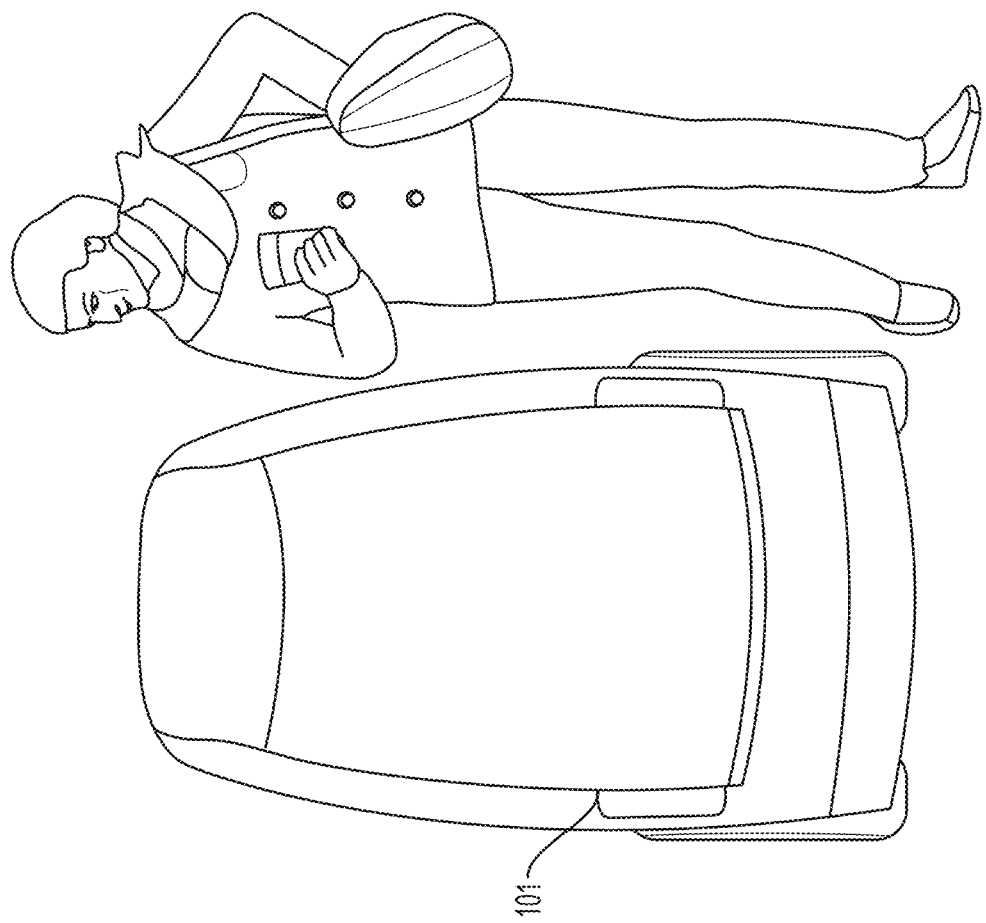
FIG. 3 is an front view of an exemplary autonomous vehicle beside a walking person, in accordance with some embodiments.
Figure 4:
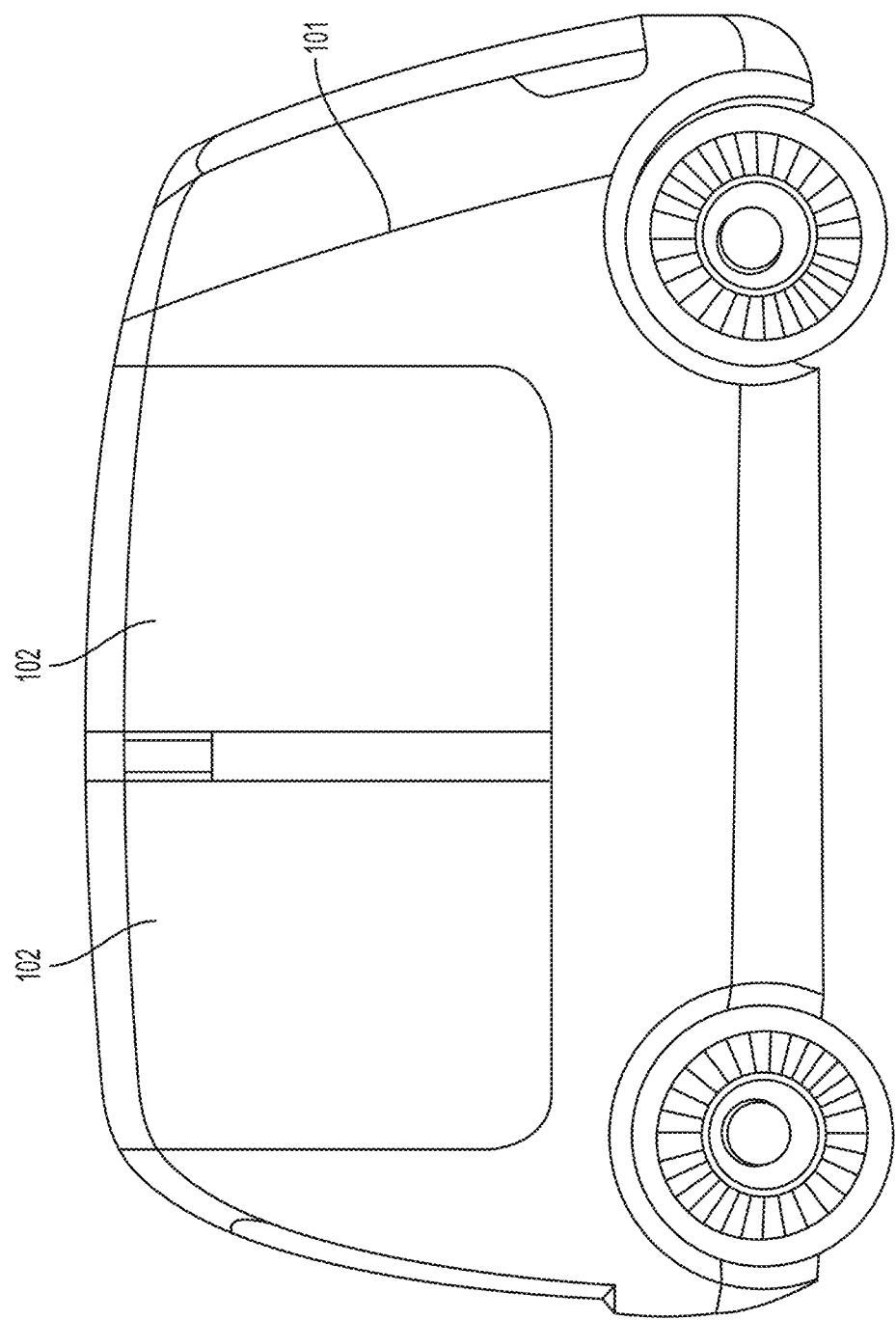
FIG. 4 is an right side view of an exemplary autonomous vehicle, in accordance with someembodiments.
Figure 5:
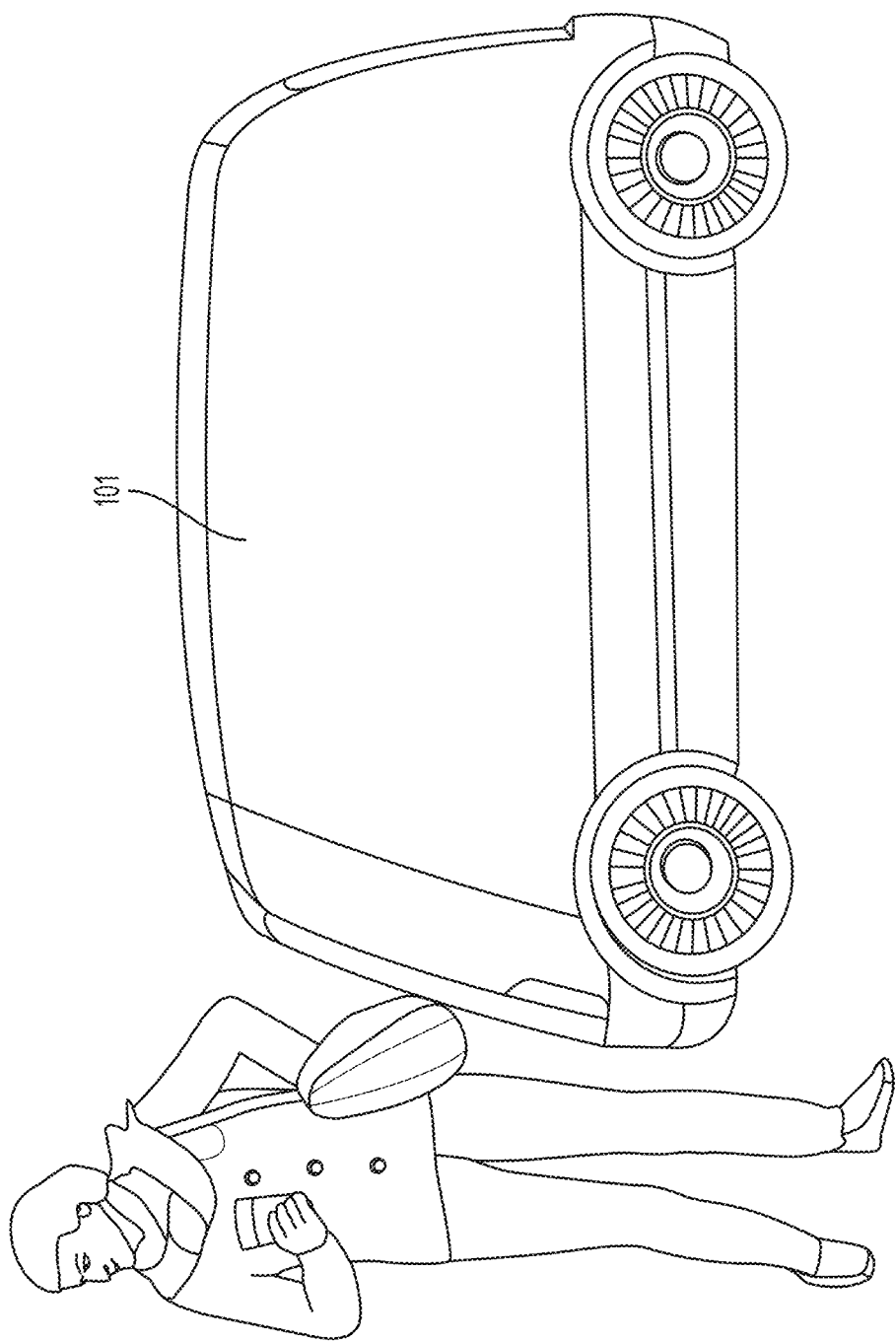
FIG. 5 is an left side view of an exemplary autonomous vehicle beside an average person, in accordance with some embodiments.
Figure 6:
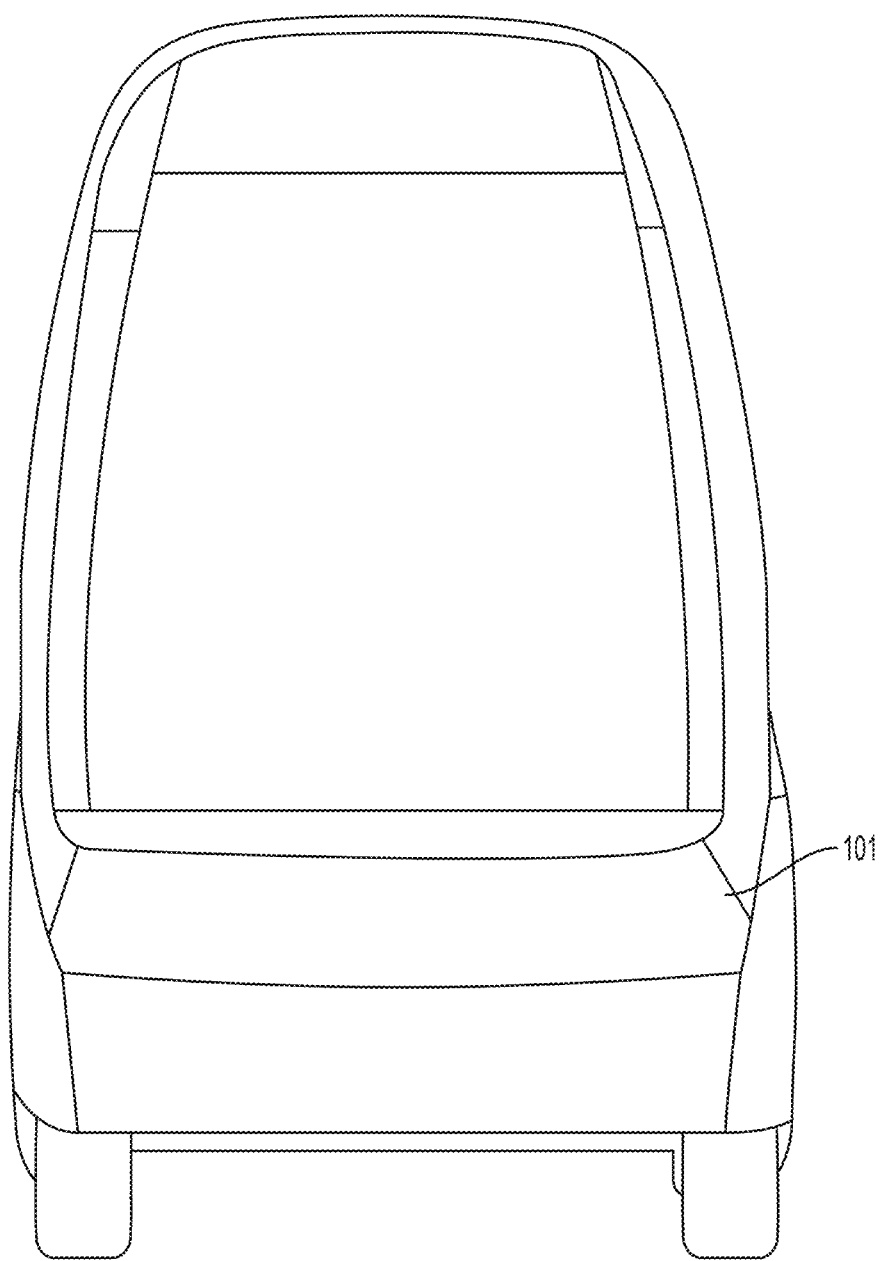
FIG. 6 is an rear view of an exemplary autonomous vehicle in accordance with some embodiments.
Figure 7:
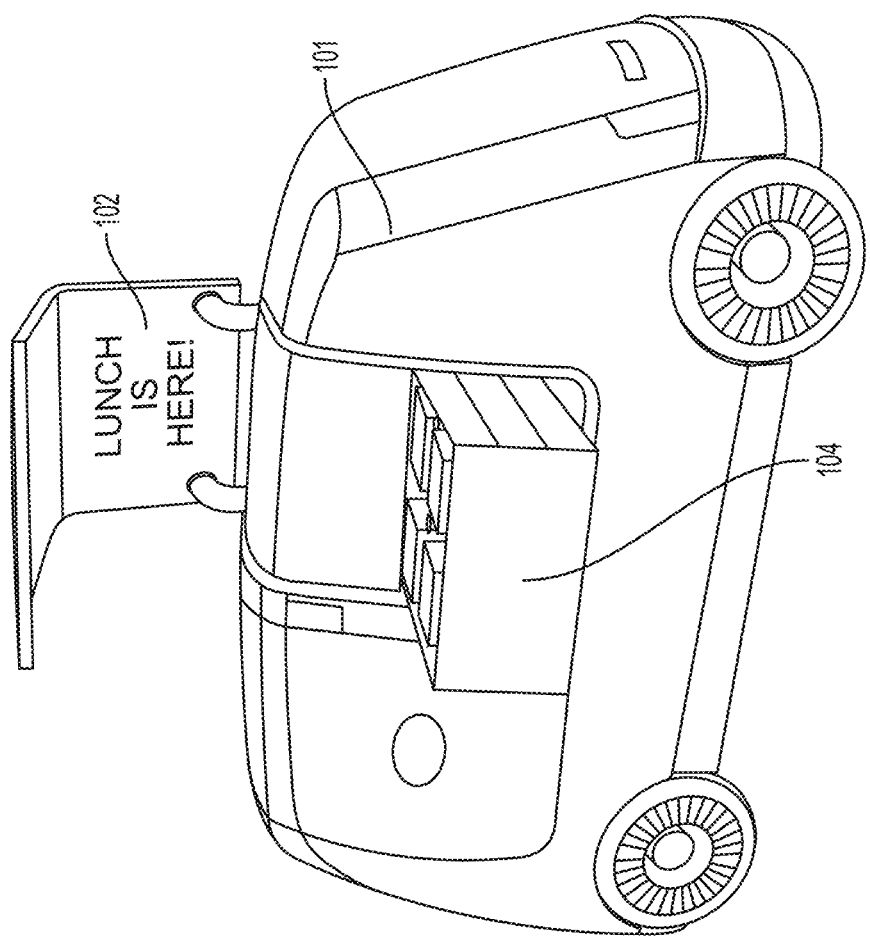
FIG. 7 is a perspective view of an exemplary food delivery autonomous vehicle, in accordance with some embodiments.

Provided herein, per FIG. 1, is a vehicle fleet 100, comprising a plurality of autonomous or semi-autonomous vehicles 101.

In some embodiments, one or more of the vehicles 101 in the vehicle fleet 100 are autonomous. In some embodiments, one or more of the vehicles 101 in the vehicle fleet 100 are autonomous. In some embodiments the semi-autonomous vehicles 101 can be manually controller by an operator. Manual override may be required to, for example, address navigation malfunctions, provider inventory issues, or unanticipated traffic, mechanical failure, electrical failure, traffic accident, and road conditions. In some embodiments of the plurality of autonomous vehicles 101 within the fleet 100 is operated on behalf of third party vendor or service provider. The third party vendor or service provider may comprise a food and beverage provider.

In some embodiments, one or more of the vehicles 101 within the vehicle fleet 100 are configured to be part of a sub-fleet 100a that operates independently or in tandem with other sub-fleets 100a. In one example, the sub-fleet 100a of vehicles 101 may only provide a product, service, or level of service associated with a single vendor. Each of the vehicles 101 in the sub-fleet 100a may display a logo of the vendor or an alternative indicator representing the specific product, service, or level of service associated with that vehicle 101. Levels of service may include immediate dedicated rush service, guaranteed morning/afternoon delivery service, and general delivery service. Some sub-fleets 100a may offer a faster or more prioritized service than other sub-fleets 100a.

Autonomous and Semi-Autonomous Vehicles

As illustrated in FIGS. 1-11, the vehicle 101 may comprise an autonomous or semi-autonomous automobile configured for land travel. The vehicle 101 may have a width, a height, and a length, wherein the length is about 2 feet to about 5 feet. The vehicle 101 may be lightweight and have a low center of gravity for increased stability. The vehicle 101 may be configurable for land, water, or air. The vehicle 101 may comprise a land vehicle such as, for example, a car, a wagon, a van, a tricycle, a truck, a trailer, a bus, a train, or a tram. The vehicle 101 may comprise a watercraft such as, for example, a ship, a boat, a ferry, a landing craft, a barge, a rafts, a hovercraft, or any combination thereof. Alternatively, the vehicle 101 may comprise an aircraft or a spacecraft. In some embodiments, the autonomous and semi-autonomous vehicles function as a roaming vending machine platform, utilizing a roaming vending machine fleet management system.

Each vehicle 101 in the fleet may comprise an autonomous propulsion system 130 comprising a drive system, a propulsion engine, a wheel, a treads, a wing, a rotor, a blower, a rocket, a propeller, a brake, or any combination thereof.

In one exemplary embodiment, a vehicle 101 comprises a land vehicle configured with a traditional 4-wheeled automotive configuration comprising conventional steering and braking systems. In this embodiment, the drive train may be configurable for standard 2-wheel drive or 4-wheel all-terrain traction drive, and the propulsion system may be configurable as a gas engine, a turbine engine, an electric motor, and/or a hybrid gas/electric engine.

In some embodiments, the vehicle 101 is configured for water travel as a watercraft with a propulsion system comprising a gas engine, a turbine engine, an electric motor and/or a hybrid gas/electric engine, or any combination thereof. In some embodiments, the vehicle 101 is configured for hover travel as an over-land or over-water hovercraft or an air-cushion vehicle (ACV) and is configured with blowers to produce a large volume of air below the hull that is slightly above atmospheric pressure. In some embodiments, the vehicle 101 is configured for air travel as an aerial drone or aerial hovercraft and is configured with wings, rotors, blowers, rockets, and/or propellers and an appropriate brake system.

The vehicle 101 may further comprise an auxiliary solar power system to provide back-up emergency power or power for minor low-power sub-systems. In some embodiments, each vehicle of the vehicle fleet is configured with one or more power sources, such as battery, solar, gasoline, or propane. In some embodiments, the vehicle 101 further comprises a digital display for curated content comprising advertisements, marketing promotions, a public service notification, an emergency notification, or any combination thereof.

Each vehicle 101 in the fleet 100 may comprise a sensor system comprising a plurality of onboard sensors such as, for example, a camera, a video camera, a LiDAR, a radar, an ultrasonic sensor, and a microphone. Each vehicle 101 may further comprise an internal computer for real time navigation and obstacle avoidance, based on the data received by the sensors.

In some embodiments, the vehicles may further comprise an autonomous propulsion system sensor configured to monitor drive mechanism performance (e.g., the propulsion engine), power system levels (e.g., battery, solar, gasoline, propane, etc.), monitor drive train performance (e.g., transmission, tires, brakes, rotors, etc.), or any combination thereof.

In some embodiments, the vehicle is further configured to process or manufacture a good. In some embodiments, the vehicle is configured to process or manufacture the good in-transit. In someembodiments, the processed or manufactured good comprises: a beverage with or without condiments (such as coffee, tea, carbonated drinks, etc.), a fast food, a microwavable food, a reheatable food, or a rehydratable food. In some embodiments, the vehicle is equipped for financial transactions through debit or credit card readers.

In some embodiments, the vehicle 101 has a driving speed of about 1 mile per hour (mph) to about 90 mph, to accommodate inner-city, residential, and intrastate or interstate driving. In some embodiments, the vehicle 101 is configured for land travel. In some embodiments, each vehicle 101 in the fleet is configured with a working speed range from 13.0 mph to 45.0 mph. In some embodiments, the vehicle 101 is configured with a maximum speed range from 13.0 mph to about 90.0 mph. In some embodiments, vehicle 101 is configured for water travel as a watercraft and is configured with a working speed range from 1.0 mph to 45.0 mph. In some embodiments, the vehicle 101 is configured for hover travel as an over-land or over-water hovercraft and is configured with a working speed range from 1.0 mph to 60.0 mph. In some embodiments, the vehicle 101 is configured for air travel as an aerial drone or aerial hovercraft and is configured with a working speed range from 1.0 mph to 80.0 mph.

Communications Module

Each autonomous vehicle 101 may comprise a communication module 160 configurable to receive and send data from the fleet management module 120, and the user. In some embodiments the data is related user interactions and autonomous vehicle fleet interactions, comprising: scheduled requests or orders, on-demand requests or orders, or a self-positioning request. In some embodiments, the communication module 160 receives and sends data via wireless transmission. In some embodiments, the wireless transmission occur via a mobile application on an electronic device via a central server, a fleet management module, a mesh network, cellular communication (e.g., 3G, 4G, and 5G), satellite communications, or any combination thereof. In some embodiments, the electronic device comprises a phone, a personal mobile device, a personal digital assistant (PDA), a mainframe computer, a desktop computer, a laptop computer, a tablet computer, and/or wearable computing device comprising: a communication headset, smart glasses, a contact lens or lenses, a digital watch, a bracelet, a ring, a jewelry, or a combination thereof.

In some embodiments, business 204 and customers 202 communicate with the fleet operator 200 through their own app/interface. In some embodiments, each autonomous vehicle 101 further comprises a memory device to store the data for future data transfer or manual download.

Securable Compartments

Figure 8:
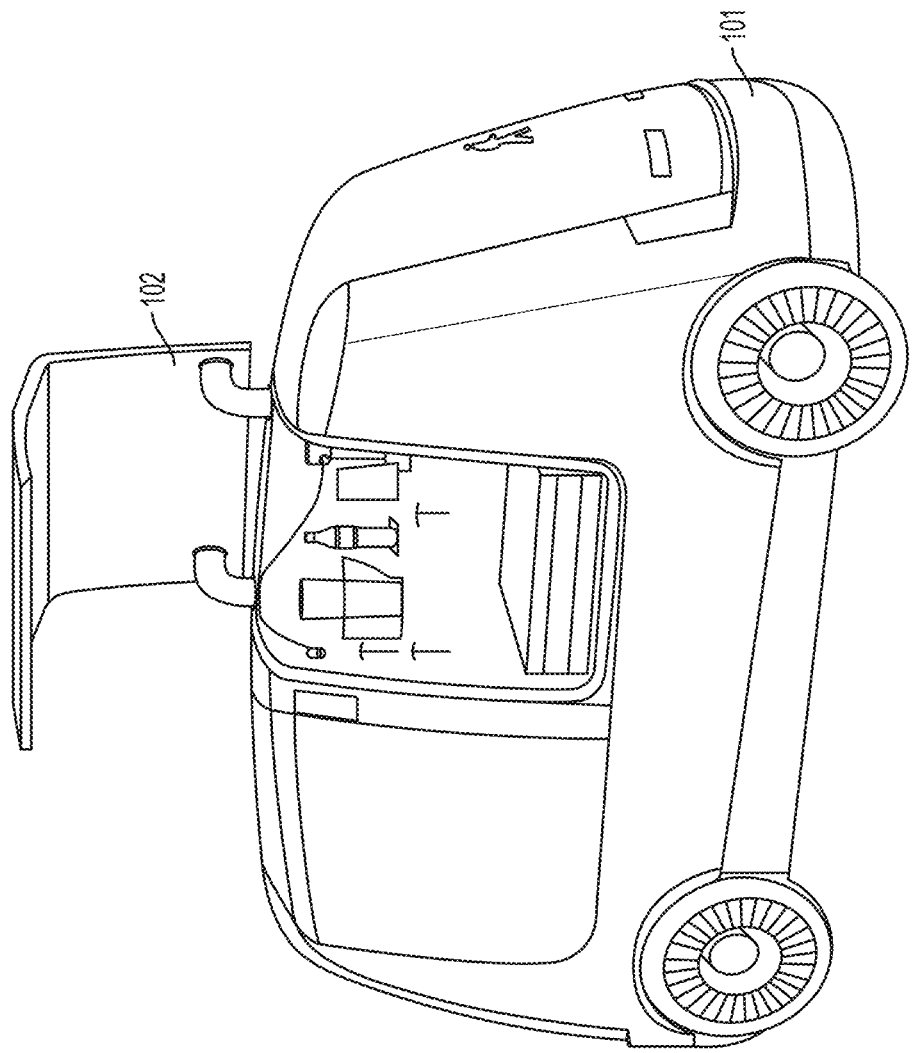
FIG. 8 is a perspective view of an exemplary pizza delivery autonomous vehicle, in accordance with some embodiments.
Figure 9:
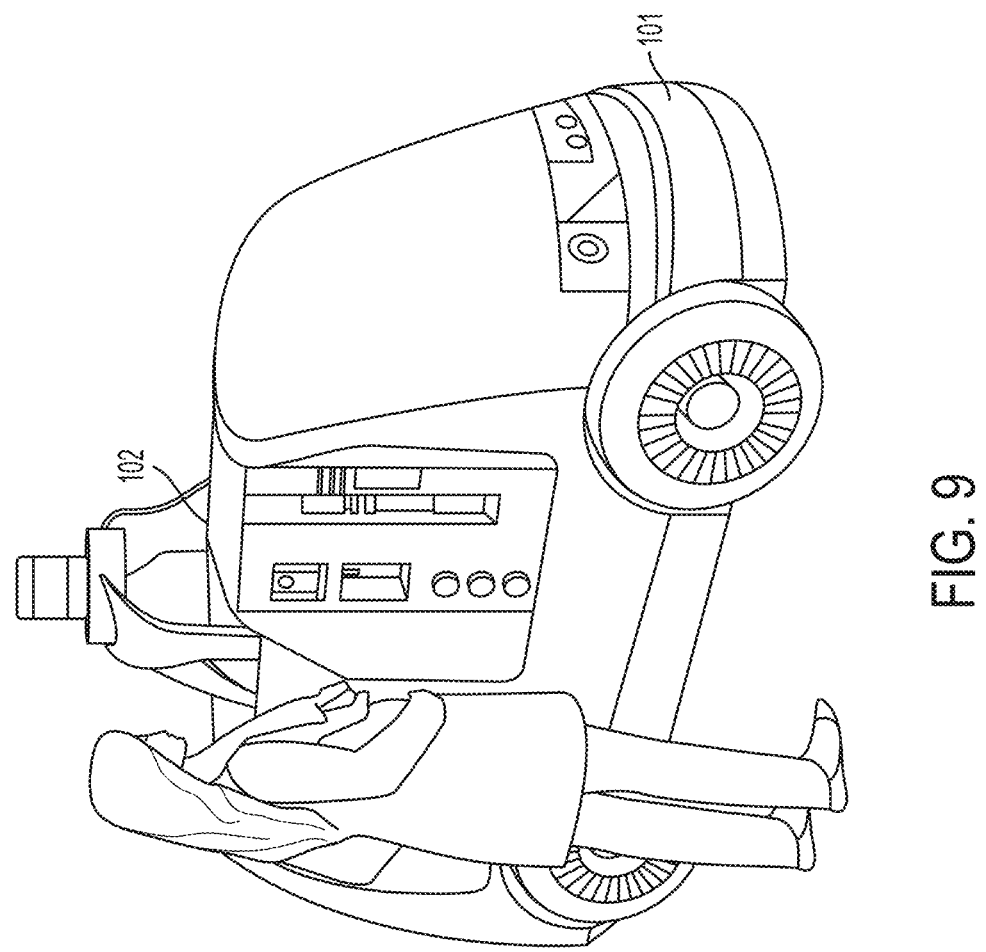
FIG. 9 is a perspective view of an exemplary coffee delivery autonomous vehicle, in accordance with some embodiments.
Figure 10:
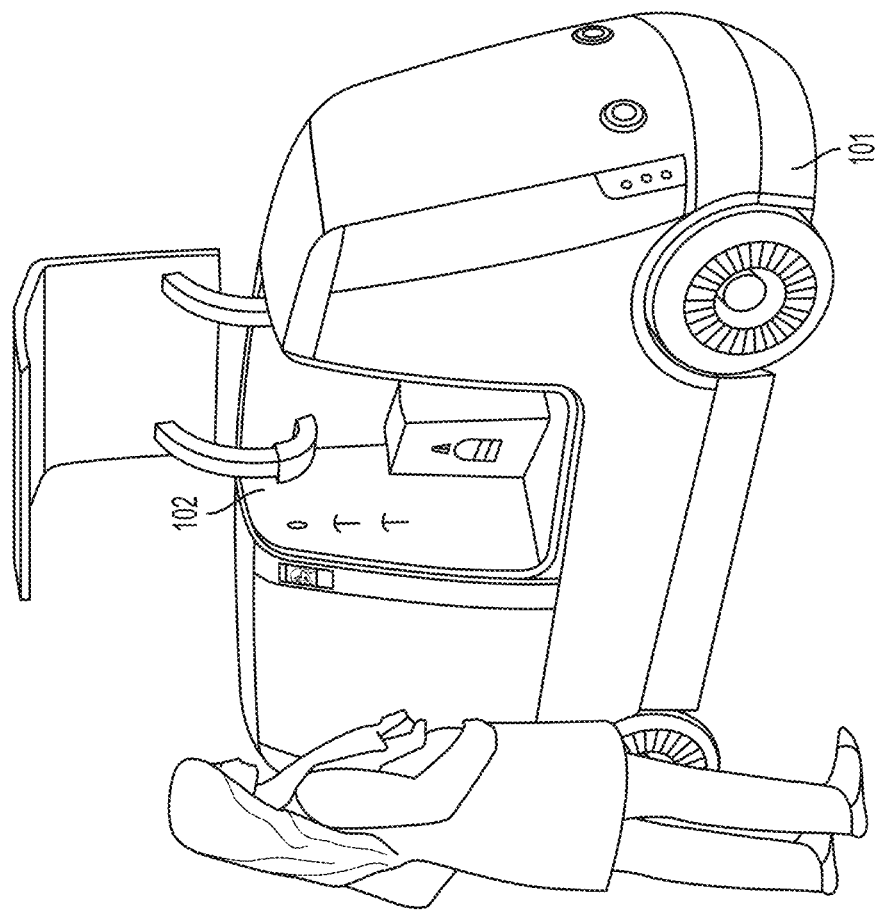
FIG. 10 is a perspective view of an exemplary meal delivery autonomous vehicle comprising a lighted interior, in accordance with some embodiments.
Figure 11A:
FIG. 11A is a perspective view of an exemplary vending autonomous vehicle, in accordance with some embodiments.
Figure 11B:
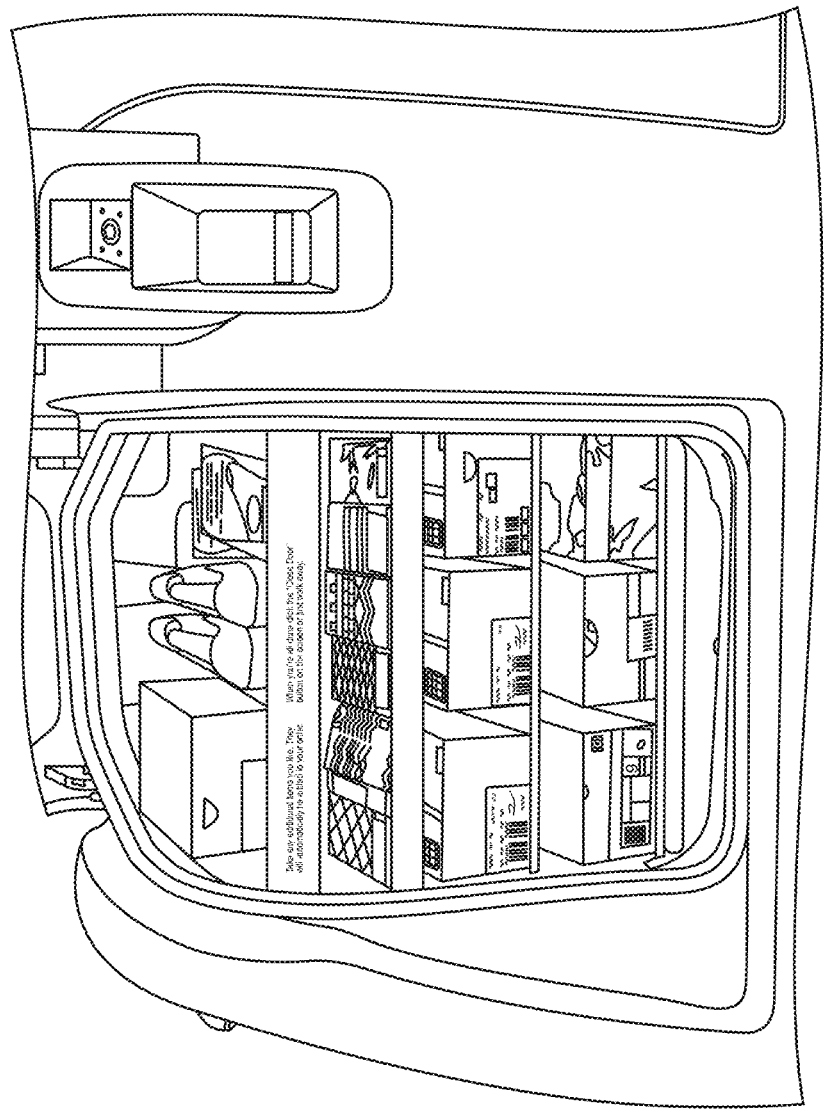
FIG. 11B is a perspective view of another exemplary vending autonomous vehicle, in accordance with some embodiments.

As illustrated in FIGS. 7-11, in some embodiments, the plurality of compartments may be humidity and/or temperature controlled for: hot goods; cold goods; wet goods; dry goods, or combinations thereof. In some embodiments, the plurality of securable compartments are configurable for a plurality of goods. Exemplary compartments and goods comprise: bookshelves for books; thin drawers for documents; larger box-like drawers for packages, sized compartments for vending machines, embedded coffee makers, pizza ovens, and dispensers. In some embodiments, the plurality of securable compartments can be configured and reconfigured based on: anticipated demands, patterns of behaviors, area of service, the types of goods to be transported, or any combination thereof. Alternately, the compartments may be configured to contain a set of goods to form a mobile marketplace (similar to a mini bar at a hotel). Further, as illustrated in FIGS. 8-10, the compartment may further comprise various additional amenities such as lights for night deliveries, condiment dispensers, and display screens.

At least one of the autonomous vehicle and the compartment may comprise a controller 150 configured to associate each one of the plurality of securable compartments 102, 104 to an assigned customer 202 or provider 204 and provide entry to the securable compartments 102, 104 upon authorization. Each securable compartments 102, 104 may be secured separately to transport goods to separate sets of customers 202. As such, the autonomous vehicle may deliver a first good or service to a first assigned customer from within a first securable compartment 102, 104 and then deliver a second good or service to a second assigned customer from within the securable compartment 102, 104.

Upon arrival of the autonomous vehicle to the customer destination, the customer may open their respective compartment(s) by verifying their identity. In one embodiment, the customer verifies their identity by providing a PIN (e.g., 4 digit number) via a touchscreen or a keypad within the autonomous vehicle, which they received upon initial request/order. The customer can verify themselves using their mobile phone and an RFID reader on the autonomous vehicle. Alternatively, the customer is verified through voice recognition of a keyword or key-phrase, wherein the autonomous vehicle comprises a microphone and a voice recognition application for recognition thereof. Further, in another embodiment, the customer is verified through facial or identification recognition, wherein the autonomous vehicle comprises a camera and a facial recognition application for recognition thereof. Additionally or alternatively, the customer is verified through a magnetic strip, RFID key or any other computer readable form of identification. Finally, in another embodiment, the customer is verified by entering a code or identification value on their mobile device, wherein the autonomous vehicle receives a cellular signal comprising a confirmation of the user or data related to the code of identification of the user.

In some embodiments, the vehicle could be configured for water travel, providing at least one and preferably two large storage compartments, and more preferably, at least one large compartment is configured with a plurality of smaller internal secure compartments of variable configurations to carry individual items that are to be delivered to, or need to be retrieved from customers. Further still, in some embodiments, the vehicle could be configured for hover travel, providing at least one and preferably two large storage compartments, and more preferably, at least one large compartment is configured with a plurality of smaller internal secure compartments of variable configurations to carry individual items that are to be delivered to, or need to be retrieved from customers. Further still, in some embodiments, the vehicle could be configured for aerial drone or aerial hover travel, providing at least one and preferably two large storage compartments, and more preferably, at least one large compartment is configured with a plurality of smaller internal secure compartments of variable configurations to carry individual items that are to be delivered to, or need to be retrieved from customers.

Fleet Management Module

Figure 12:
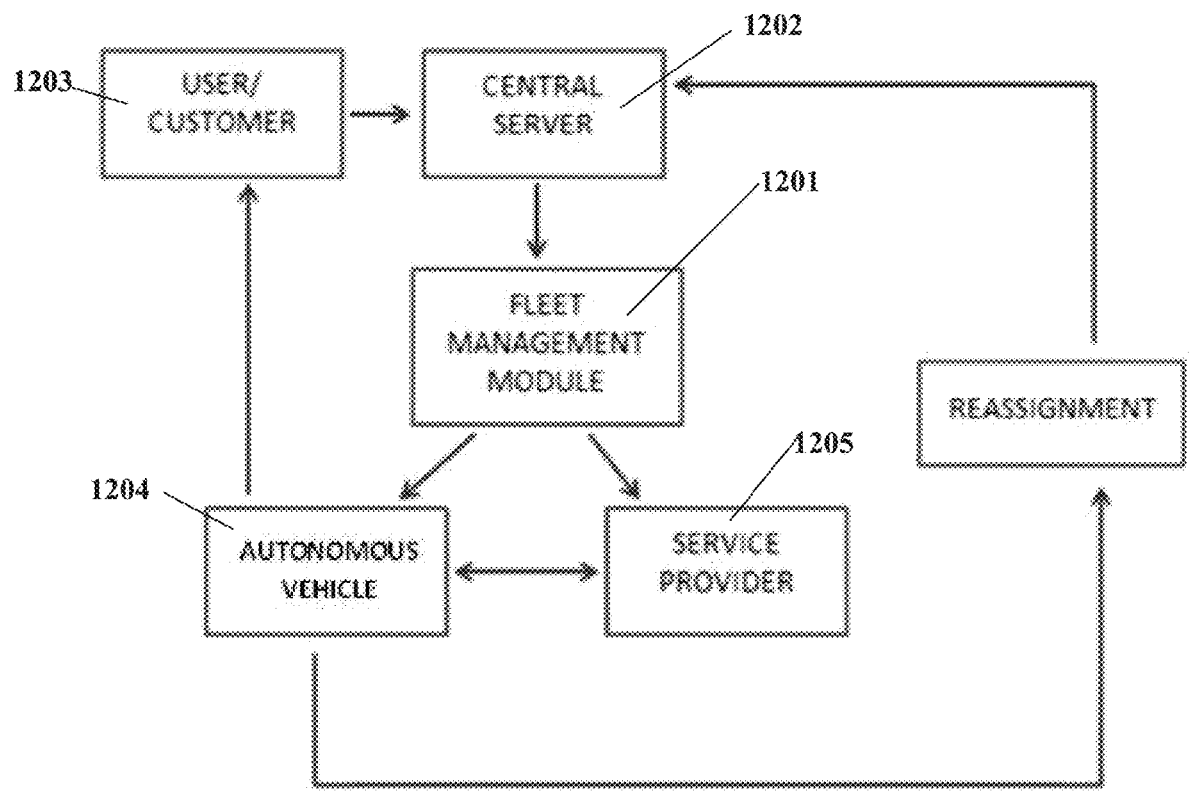
FIG. 12 is an exemplary flowchart representation of the logic for a fleet management control module associated with a central server for the autonomous vehicle fleet, in accordance with some embodiments.

Provided herein, per FIG. 12, is a system for fleet management comprising a fleet management module 1201, a central server 1202, a vehicle 1204, a customer 1203, and a service provider 1205. In some embodiments, the fleet management module 1201 coordinates, assigns tasks, and monitors the position of each of the plurality of vehicles 1204 in the fleet. The fleet management module 1201 may coordinate the vehicles 1204 in the fleet to monitor and collect data regarding unstructured open or closed environments, and report to the service provider 1205. As seen, the fleet management module 1201 may coordinate with a central server 1202. The central server 1202 may be located in a central operating facility owned or managed by the fleet owner. The service provider 1205 may comprise a third party provider of a good or service. The service provider 1205 may comprise a vendor, a business, a restaurant, a delivery service, a retailer, or any combination thereof.

In some embodiments, the fleet management module 1201 is configured to receive, store and transmit data to and/or from the service provider 1205. The fleet management module 1201 may receive and transmit data to and/or from the service provider 1205 via a service provider application. In some embodiments, the service provider application comprises a computer application, an internet application, a tablet application, a phone application, or any combination thereof.

In some embodiments, the central server 1202 is configured to receive, store and transmit data to and/or from the customer 1203. The central server 1202 may receive and transmit data to and/or from the customer 1203 via a customer application. In some embodiments, the customer application comprises a computer application, an internet application, a tablet application, a phone application, or any combination thereof.

In some embodiments, the vehicle 1204 comprises a memory device to store the data for future data transfer or manual download.

In one example, an order by a customer 1203 is transmitted to a central server 1202, which then communicates with the fleet management module 1201, which relays the order to the service provider 1205 associated with the order and a vehicle 1204. The fleet management module 1201 may employ one or more vehicles 1204 or sub-fleet vehicles 1204 that are closest to the service provider 1205, customer 1203, or both. The assigned service provider then interacts with that vehicle 1204 through a service provider application to supply the vehicle 1204 with any goods, maps, or instructions associated with the order. The vehicle 1204 then travels to the customer 1203 and reports completion of the order to at least one of the customer 1203, the service provider 1205, the central server 1202, and the fleet management module 1201.

In some embodiments the vehicle 1204 may be operated on behalf of the service provider 1205, wherein at least one of the central server 1202 and the fleet management module 1201 is operated by the service provider 1205. In any one of the embodiments, the vehicle 1204 is controlled directly by the customer 1203, the service provider 1205, or both. In some embodiments, human interaction of the vehicle 1204 may be required to address maintenance issues such as mechanical failure, electrical failure or a traffic accident.

In one example, the fleet management module 1201 receives an instruction from the service provider 1205 to collect an item at a first location and deliver the item to a second location. Upon receipt of the instruction, the fleet management module 1201 may assign one or more of the vehicles 1204 to perform the instruction by navigating the one or more of the vehicles 1204 the first location. The one more of the vehicles 1204 may then confirm the receipt of the item and navigate to the second location. The one more of the vehicles 1204 may then deliver the item to the second location and confirm receipt of the delivery. In some embodiments, the one more of the vehicles 1204 may further receive an identification associated with the first location, the second location, or both, to enable receipt and delivery of the item.

In one example, a request by the customer 1203 is sent to the central server 1202, which then communicates with the fleet management module 1201 to relay the request to the service provider 1205, which instructs the vehicles 1204. The fleet management module 1201 may select one or more of the vehicles 1204 within the geographic region and/or proximity of the customer 1203, the service provider 1205, or both. The vehicles 1204 may be first directed to a location associated with the service provider 1205 to receive an item associated with the request. The vehicle 1204 may then travel to a location associated with the customer 1203. The customer 1203 may then interacts with the one or more vehicle 1204 to retrieve the item. The customer 1203 may retrieve the item by opening a compartment within the vehicle 1204. The customer 1203 may open the compartment within the vehicle 1204 through a customer application, or a customer interface comprising, for example, an RFID reader, a touchpad, a keypad, a voice command, or a vision-based recognition. Upon completion the vehicles 1204 may then report a completion of the request to the fleet management module 1201 and be reassigned to a subsequent request.

In some embodiments, the autonomous fleet may be strategically positioned throughout a geographic region in anticipation of a known demand. Demand for autonomous vehicle services maybe predicted by storing historical demand data relating to the quantity, timing, and type of request received in each region. Such demand predictions may further be weighted by the cost or importance of the good or service and employ historical trends for higher efficiency and throughput. As such, the fleet management module may position the autonomous vehicles as close as possible to the expected source locations.

Figure 13:
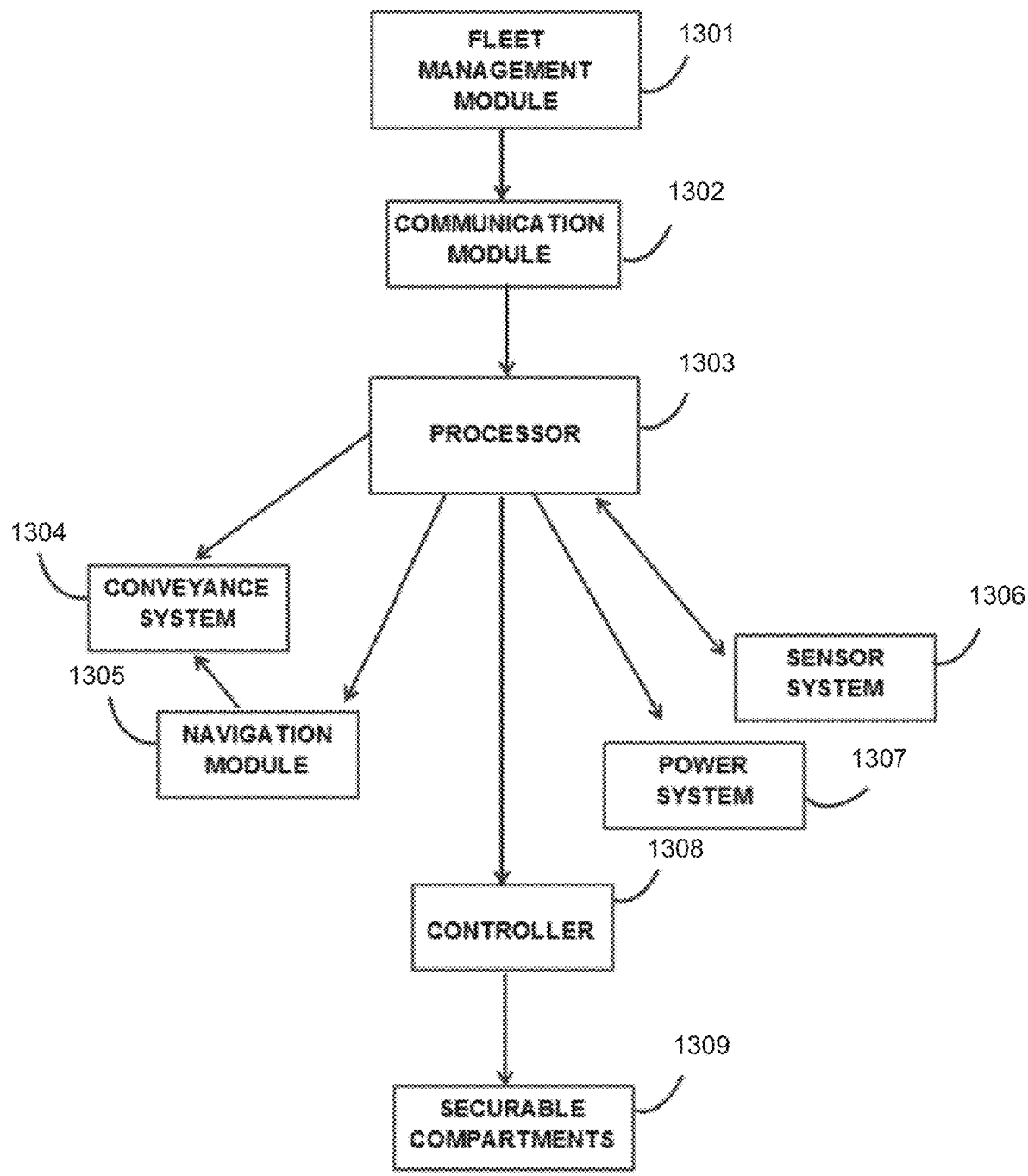
FIG. 13 is an exemplary flowchart representation of the logic flow from the Fleet Management Control Module through the autonomous vehicle processor to the various systems and modules of the autonomous vehicle, in accordance with some embodiments.

Per FIG. 13, the fleet management module 1301 instructs the processor 1303 of the autonomous or semi-autonomous vehicle via a communication module 1302. The processor 1303 may be configured to send an instruction and receive a sensed data from the sensor system 1306, and may further control at least one of the power system 1307, the navigation module 1305, and the conveyance system 1304. The processor 1303 may additionally be configured to instruct a controller 1308 to open a securable compartment 1309 to release any contents associated with an order. The processor 1303 may allow manual override of the conveyance system 1304, the navigational system 1305, or both.

In some embodiments, the processor 1303 is in functional communication with the communication module 1302. In some embodiments, the communication module 1302 is adapted to receive, store, and/or transmit data to and from the customer and the fleet management module 1301. In some embodiments, the data comprises a schedule, a request or order, a current location, a delivery location, a service provider location, a route, an estimated time of arrival (ETA), a repositioning instruction, a vehicle condition, a vehicle speed, or any combination thereof. In some embodiments, the processor 1303 is capable of both high-level computing for processing as well as low-level safety-critical computing capacity for controlling the hardware. The processor 1303 may configured to direct the conveyance system 1304, the navigation module 1305, the sensor system 1306, the power system 1307, the controller 1308, or any combination thereof. The processor 1303 may reside aboard the autonomous or semi-autonomous vehicle, or at a remote location.

In some embodiments, the communication module 1302 is configured to receive, store and transmit data via wireless transmission (e.g., 4G, 5G, or satellite communications). In some embodiments, the wireless transmission occurs via: a central server, a fleet management module, a mesh network, or any combination thereof. In some embodiments, the customer application is configured to send and receive data via an electronic device comprising a phone, a personal mobile device, a personal digital assistant (PDA), a mainframe computer, a desktop computer, a laptop computer, a tablet computer, and/or wearable computing device comprising: a communication headset, smart glasses, or a combination thereof.

In some embodiments, the fleet management module 1301 directs each of the vehicles 1204 through a navigation module 1305. In some embodiments, the navigation module 1305 controls the conveyance system 1304 to translate the autonomous or semi-autonomous vehicle through the unstructured open or closed environments. In some embodiments, the navigation module 1305 comprises an HD maps, a weather condition, an elevation map, a digital map, a street view photograph, a GPS point, or any combination thereof. In some embodiments, the map is generated by a customer, a customer, a service provider, a fleet operator, an online repository, a public database, or any combination thereof. In some embodiments, the map is generated only for intended operational geography. The maps may be augmented or confirmed by data obtained by the sensor system 1306. The navigation module 1305 may further implement data collected by the sensor system 1306 to determine the location and/or the surroundings of the autonomous or semi-autonomous vehicle. In some embodiments, the map further comprises a navigation marker comprising a lane, a road sign, an intersection, a grade, or any combination thereof. As such the navigation module 1305, in combination with processors and/or applications vehicles 1204 enable a safe, robust navigation trajectory.

In some embodiments, the fleet management module 1301 is configured to determine and predict a geographic demand for the autonomous or semi-autonomous vehicles for strategic placement throughout a geographic region in anticipation of a known demand. The fleet management module 1301 may determine and predict a geographic demand by storing data relating the location, quantity, time, price, item, item type, service, service type, service provider, or any combination thereof of placed orders and requests. Further, the service provider may provide independently measured trends to supplement or augment the measured trends. As such, the vehicles may be strategically placed to reduce transit and idle time and to increase sales volume and efficiency.

Operating Environments

The autonomous vehicles 101 in the fleet 100 may be configured to operate within a variety of unstructured open operating environments to enable service to a broad range of locations.

In some embodiments, the unstructured open environment is a non-confined geographic region accessible by navigable pathways comprising: public roads; private roads; bike paths; open fields, open public lands, open private lands, pedestrian walkways, lakes, rivers, or streams.

In some embodiments, the closed environment is a confined, enclosed, or semi-enclosed structure accessible by navigable pathways comprising: open areas or rooms within commercial architecture, with or without structures or obstacles therein; airspace within open areas or rooms within commercial architecture, with or without structures or obstacles therein; public or dedicated aisles; hallways; tunnels; ramps; elevators; conveyors; or pedestrian walkways.

In some embodiments, the unstructured open environment is a non-confined airspace or even near-space environment which includes all main layers of the Earth's atmosphere comprising the troposphere, the stratosphere, the mesosphere, the thermosphere and the exosphere. In some embodiments, the navigation module controls routing of the conveyance system of the vehicles in the fleet in the unstructured open or closed environments.

Goods and Services

In some embodiments, the user comprises a fleet manager, a sub-contracting vendor, a service provider, a customer, a business entity, an individual, or a third party.

In some embodiments, the services comprises a subscription service, a prescription service, a marketing service, an advertising service, a notification service, a requested service, an ordered service, a scheduled delivery service, or any combination thereof. For example, the scheduled delivery services may include special repeat deliveries such as groceries, prescriptions, drinks, mail, documents, or any combination thereof.

In some embodiments, the services alternatively or further comprise a return of a good (e.g., a signed document), receiving one set of goods and returning a different set of goods (e.g., product replacement/returns, groceries, merchandise, books, recording, videos, movies, payment transactions, etc.), or a third party user providing instruction and or authorization to a goods or service provider to prepare, transport, deliver and/or retrieve goods to a principle user in a different location. In some embodiments, the services further or alternatively comprise: advertising services, land survey services, patrol services, monitoring services, traffic survey services, signage and signal survey services, architectural building, or road infrastructure survey services.

In some embodiments, the service further or alternatively comprises processing or manufacturing a good. In some embodiments, the autonomous vehicle is configured to process or manufacture the good in-transit. In some embodiments, the processed or manufactured good comprises: a beverage with or without condiments (such as coffee, tea, carbonated drinks, etc.), a fast food, a microwavable food, a reheatable food, or a rehydratable food. In some embodiments, the service comprises a financial transaction.

In some embodiments, the service comprises advertising, marketing, public safety, public service, or any combination thereof.

Controller(s) and Processor(s)

In some embodiments, each autonomous vehicle in the autonomous vehicle fleet is equipped with one or more processors 125 capable of both high-level computing for processing as well as low-level safety-critical computing capacity for controlling the hardware. The at least one processor is configured to manage the conveyance system, the navigation module, the sensor system, instructions from the fleet management module, the communication module and the controller.

Further still, in some embodiments, each autonomous vehicle in the autonomous vehicle fleet is equipped with a controller 150 configurable to associate each one of the plurality of securable compartments 102, 104 to an assignable customer 202 or provider 204 and provide entry when authorized.

Digital Processing Device

In some embodiments, the platforms, systems, media, and methods described herein include a digital processing device, or use of the same. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, and media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, AppleTV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with the digital processing device, such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 14:
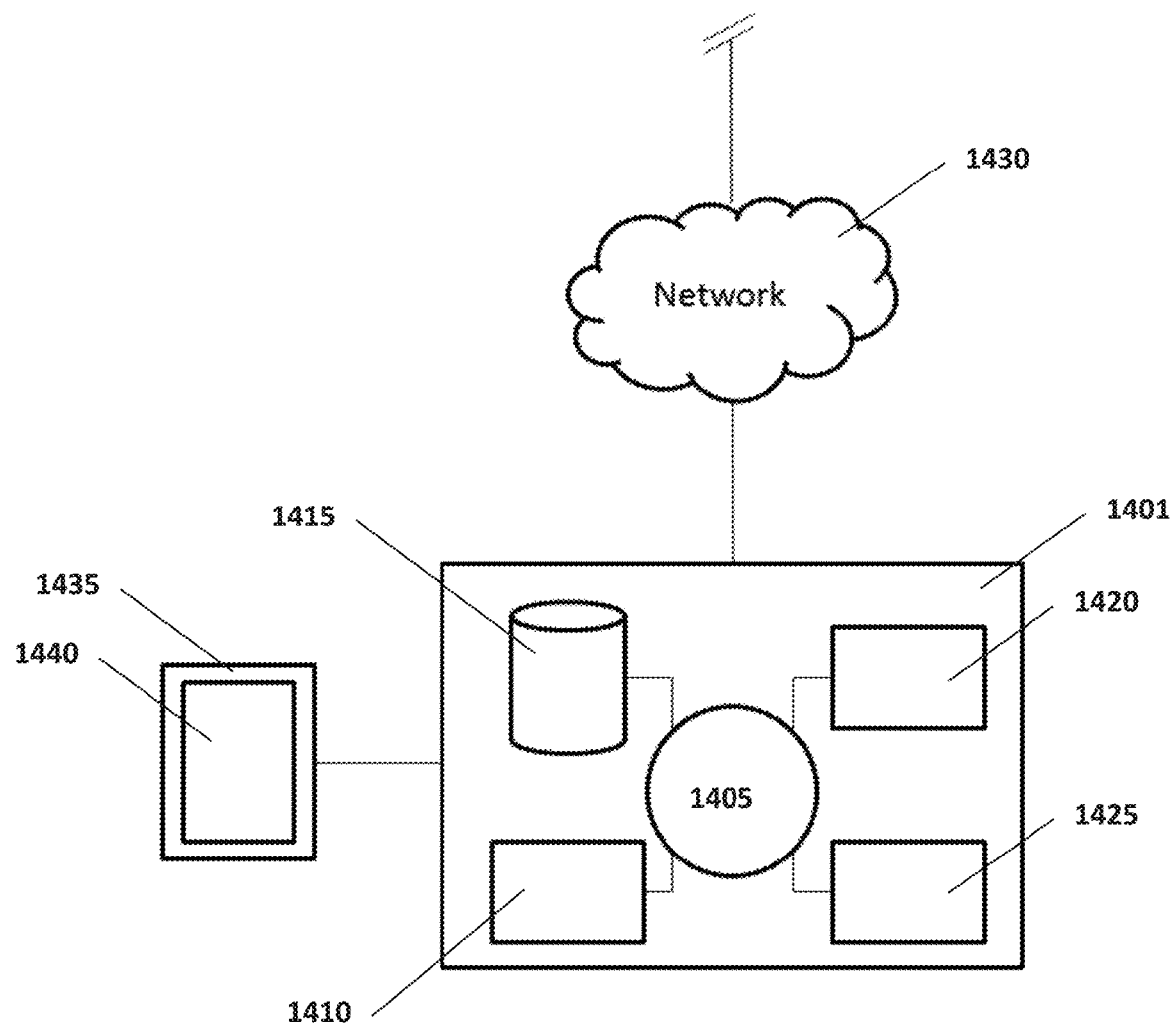
FIG. 14 shows a non-limiting schematic diagram of a digital processing device; in this case, a device with one or more CPUs, a memory, a communication interface, and a display.

Referring to FIG. 14, in a particular embodiment, a digital processing device 1401 is programmed or otherwise configured to managing autonomous vehicles. The device 1401 is programmed or otherwise configured to manage autonomous vehicles. In this embodiment, the digital processing device 1401 includes a central processing unit (CPU, also "processor" and "computer processor" herein) 1405, which is optionally a single core, a multi core processor, or a plurality of processors for parallel processing. The digital processing device 1401 also includes memory or memory location 1410 (e.g., random-access memory, read-only memory, flash memory), electronic storage unit 1415 (e.g., hard disk), communication interface 1420 (e.g., network adapter) for communicating with one or more other systems, and peripheral devices 1425, such as cache, other memory, data storage and/or electronic display adapters. The memory 1410, storage unit 1415, interface 1420 and peripheral devices 1425 are in communication with the CPU 1405 through a communication bus (solid lines), such as a motherboard. The storage unit 1415 comprises a data storage unit (or data repository) for storing data. The digital processing device 1401 is optionally operatively coupled to a computer network ("network") 1430 with the aid of the communication interface 1420. The network 1430, in various cases, is the internet, an internet, and/or extranet, or an intranet and/or extranet that is in communication with the internet. The network 1430, in some cases, is a telecommunication and/or data network. The network 1430 optionally includes one or more computer servers, which enable distributed computing, such as cloud computing. The network 1430, in some cases, with the aid of the device 1401, implements a peer-to-peer network, which enables devices coupled to the device 1401 to behave as a client or a server.

Continuing to refer to FIG. 14, the CPU 1405 is configured to execute a sequence of machine-readable instructions, embodied in a program, application, and/or software. The instructions are optionally stored in a memory location, such as the memory 1410. The instructions are directed to the CPU 105, which subsequently program or otherwise configure the CPU 1405 to implement methods of the present disclosure. Examples of operations performed by the CPU 1405 include fetch, decode, execute, and write back. The CPU 1405 is, in some cases, part of a circuit, such as an integrated circuit. One or more other components of the device 1401 are optionally included in the circuit. In some cases, the circuit is an application specific integrated circuit (ASCI) or a field programmable gate array (FPGA).

Continuing to refer to FIG. 14, the storage unit 1415 optionally stores files, such as drivers, libraries and saved programs. The storage unit 1415 optionally stores user data, e.g., user preferences and user programs. The digital processing device 1401, in some cases, includes one or more additional data storage units that are external, such as located on a remote server that is in communication through an intranet or the internet.

Continuing to refer to FIG. 14, the digital processing device 1401 optionally communicates with one or more remote computer systems through the network 1430. For instance, the device 1401 optionally communicates with a remote computer system of a user. Examples of remote computer systems include personal computers (e.g., portable PC), slate or tablet PCs (e.g., Apple® iPad, Samsung® Galaxy Tab, etc.), smartphones (e.g., Apple® iPhone, Android-enabled device, Blackberry®, etc.), or personal digital assistants.

Methods as described herein are optionally implemented by way of machine (e.g., computer processor) executable code stored on an electronic storage location of the digital processing device 101, such as, for example, on the memory 1410 or electronic storage unit 1415. The machine executable or machine readable code is optionally provided in the form of software. During use, the code is executed by the processor 1405. In some cases, the code is retrieved from the storage unit 1415 and stored on the memory 1410 for ready access by the processor 1405. In some situations, the electronic storage unit 1415 is precluded, and machine-executable instructions are stored on the memory 1410.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® ActionScript, JavaScript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight Java™, and Unity®.

Figure 15:
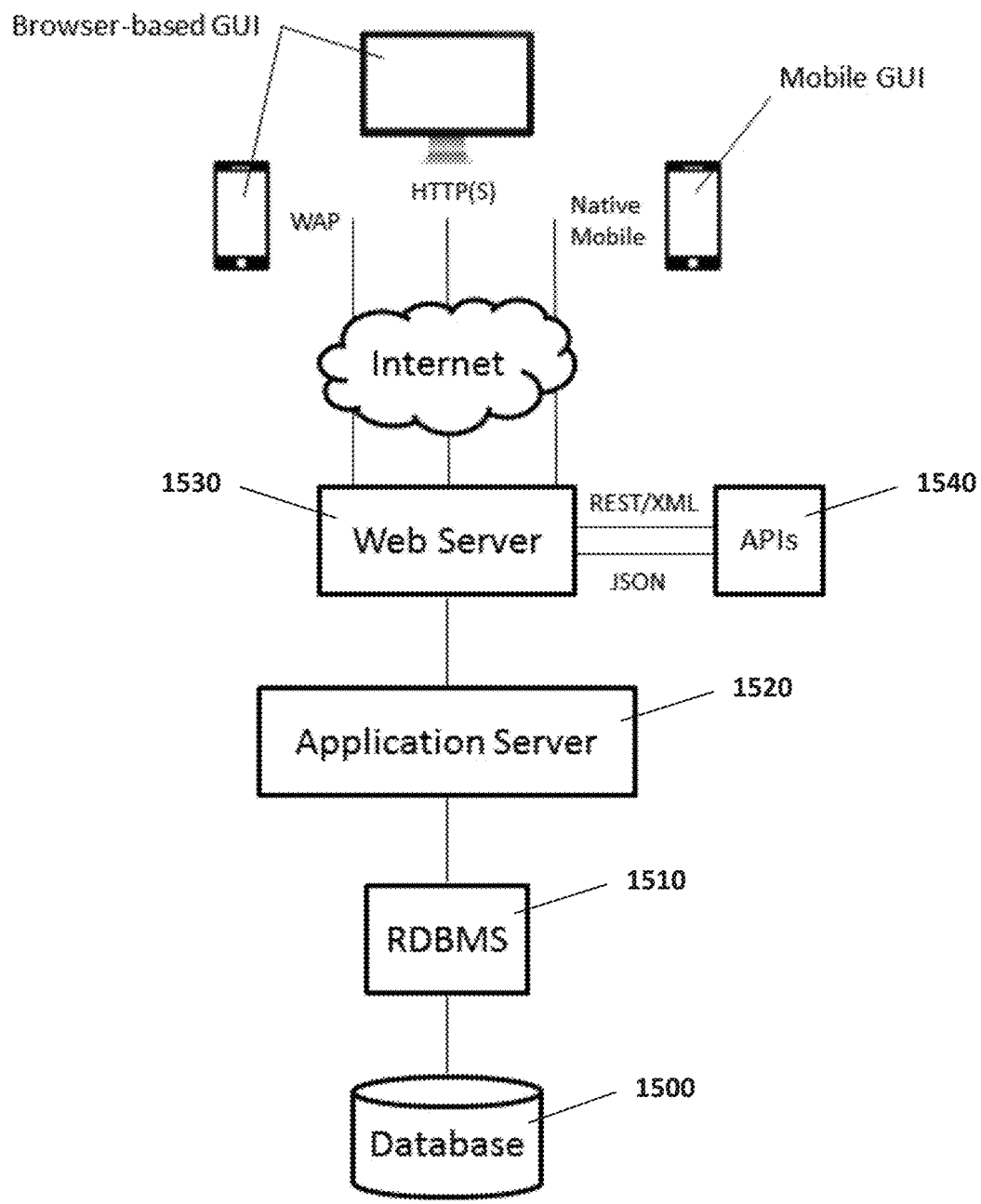
FIG. 15 shows a non-limiting schematic diagram of a web/mobile application provision system; in this case, a system providing browser-based and/or native mobile user interfaces.

Referring to FIG. 15, in a particular embodiment, an application provision system comprises one or more databases 1500 accessed by a relational database management system (RDBMS) 1510. Suitable RDBMSs include Firebird, MySQL, PostgreSQL, SQLite, Oracle Database, Microsoft SQLServer, IBM DB2, IBM Informix, SAP Sybase, SAP Sybase, Teradata, and the like. In this embodiment, the application provision system further comprises one or more application severs 1520 (such as Java servers, .NET servers, PHP servers, and the like) and one or more web servers 1530 (such as Apache, IIS, GWS and the like). The web server(s) optionally expose one or more web services via app application programming interfaces (APIs) 1540. Via a network, such as the internet, the system provides browser-based and/or mobile native user interfaces.

Figure 16:
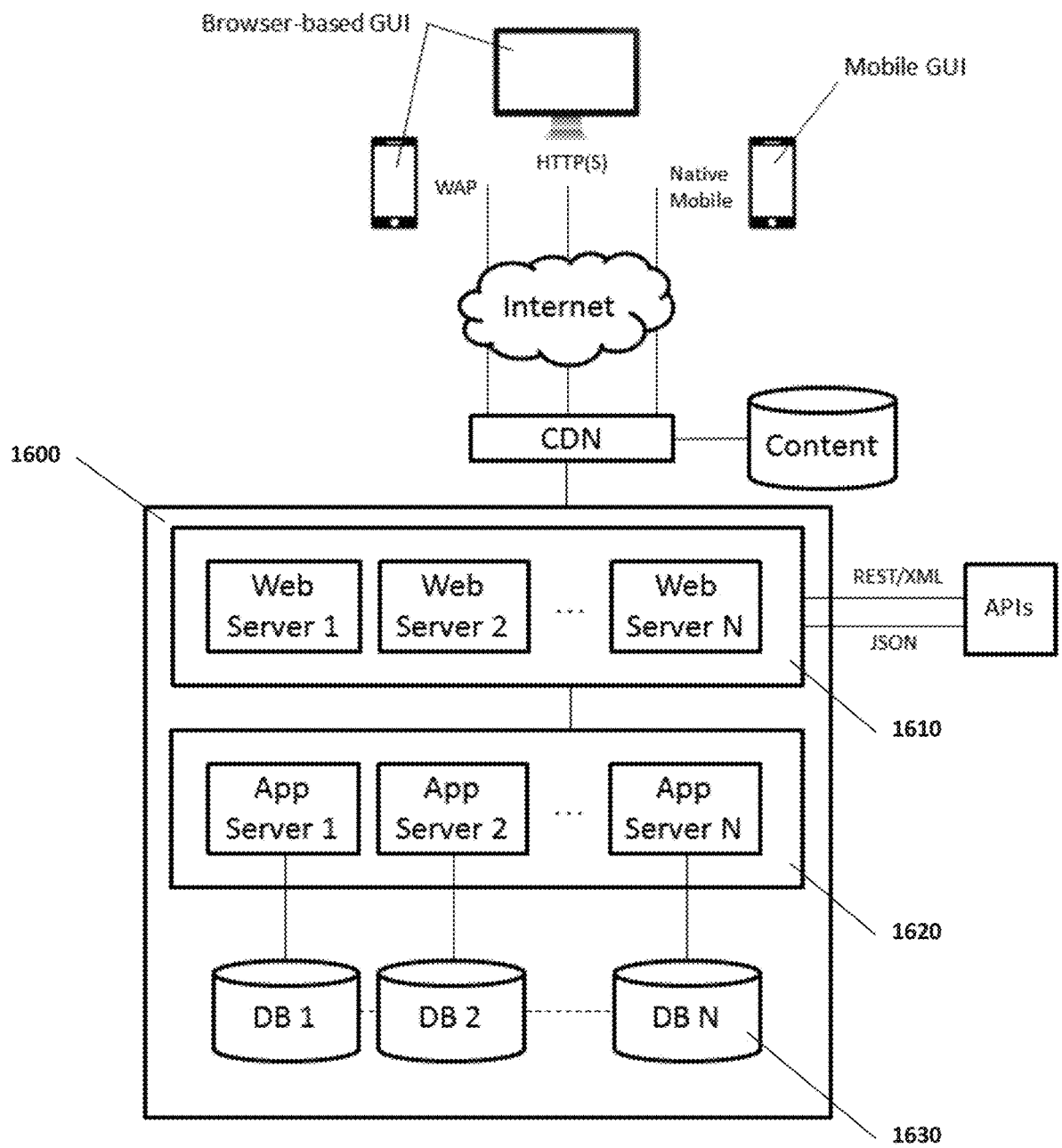
FIG. 16 shows a non-limiting schematic diagram of a cloud-based web/mobile application provision system; in this case, a system comprising an elastically load balanced, auto-scaling webserver and application server resources as well synchronously replicated databases.
Figure 17:
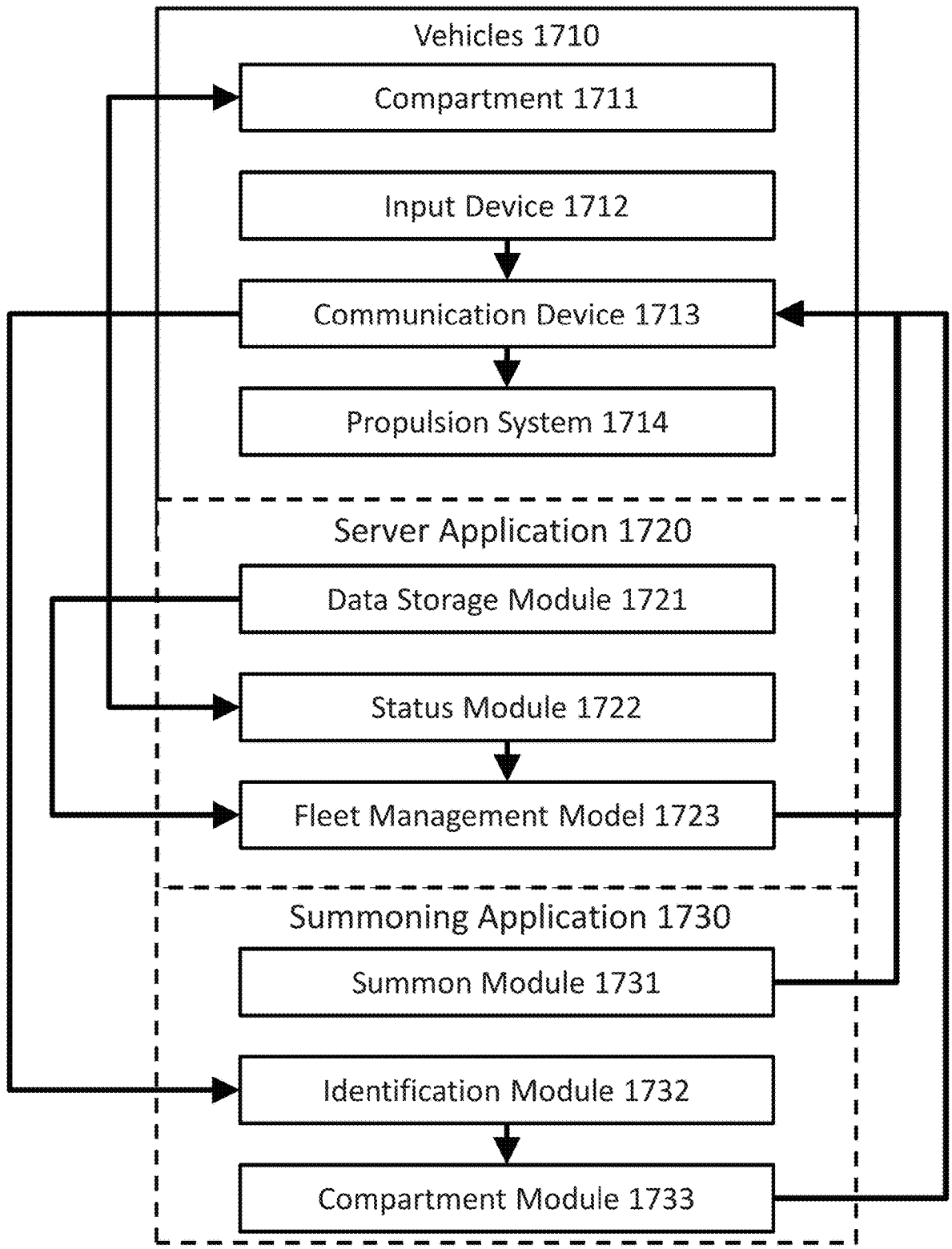
FIG. 17 shows a non-limiting schematic diagram of an autonomous or semi-autonomous platform for positioning a plurality of autonomous or semi-autonomous vehicles and displaying a plurality of items.

Referring to FIG. 16, in a particular embodiment, an application provision system alternatively has a distributed, cloud-based architecture 1600 and comprises elastically load balanced, auto-scaling web server resources 1610, and application server resources 1620 as well synchronously replicated databases 1630.

Platform For Positioning Vehicles and Displaying a Plurality of Items

One aspect provided herein is an autonomous or semi-autonomous platform for positioning a plurality of autonomous or semi-autonomous vehicles 1710 and displaying a plurality of items, the platform comprising the plurality of autonomous or semi-autonomous vehicles 1710, a server processor configured to provide a server application 1720, and summoning processor configured to provide a summoning application 1730. The plurality of autonomous or semi-autonomous vehicles 1710 may comprise 2, 3, 4, 5, 6, 8, 10, 15, 20, 25, 30, 35, 40, 50, 100, 200, 300, 500, 1,000, 5,000, 10,000 or more vehicles 1710, including increments therein.

Each vehicle 1710 may comprise a compartment 1711, an input device 1712, a communication device 1713, and an autonomous or semi-autonomous propulsion system 1714. Each vehicle 1710 may comprise 1, 2, 3, 4, 5, 6, 8, 10, 15, 20, 25, 30, 35, 40, 50, or more compartments 1711, including increments therein. In some embodiments, each vehicle 1710 further comprises an energy storage device configured to provide power to the autonomous or semi-autonomous propulsion system 1714. The energy storage device may comprises a battery, a capacitor, a supercapacitor, or any combination thereof. In some embodiments, the vehicle 1710 further comprises an energy harvesting device configured to collect energy. In some embodiments, the energy harvesting device is configured to provide energy to the energy storage device.

In some embodiments, the input data comprises the customer identification. The input device 1712 may be configured to receive an input data. The input data may correspond to a customer. The customer identification may comprise a customer name, a customer address, a customer email address, a customer identification number, a customer password, a customer image, a customer facial profile, a customer fingerprint or any combination thereof. In some embodiments, the input device 1712 comprises a button, a touchscreen, a Bluetooth sensor, a wireless network device, a cellular network device, a camera, a USB input, a keyboard, or any combination thereof. In some embodiments, the input data comprises a password, a key code, a facial recognition, a RFID recognition, a barcode recognition, a USB device input, a vocal signal, or any combination thereof. Each vehicle 1710 may comprise 1, 2, 3, 4, 5, 6, 8, 10, or more input devices 1712. The communication device 1713 may comprise a wired communication device 1713, a Wi-Fi communication device 1713, a Bluetooth communication device 1713, a cellular communication device 1713, or any combination thereof.

The compartment 1711 may be configured to contain and secure two or more of the plurality of items. The compartment 1711 may be configured to contain and secure 1, 2, 3, 4, 5, 6, 8, 10, 15, 20, 25, 30, 35, 40, 50, or more items, including increments therein. In some embodiments, the compartment 1711 comprises a sensor. In some embodiments, the compartment 1711 comprises 1, 2, 3, 4, 5, 6, 8, 10, 15, 20, 25, 30, 35, 40, 50, or more sensors, including increments therein. The sensor may be configured to detect an item status of one or more of the items. Each sensor may be configured to detect an item status of a single item. Two or more sensor may be configured to detect an item status of a single item. The item status may comprise an expired status, an available status, a presence of the item, an absence of the item, or any combination thereof. In some embodiments, the sensor comprises at least one of a thermometer, a barcode scanner, an RFID reader, a scale, a pressure sensor, a switch, and a camera. In some embodiments, the compartment 1711 comprises an item emitting mechanism configured to emit the items within the compartment 1711. In some embodiments, each item emitting mechanism configured to emit one item within the compartment 1711. In some embodiments, each item emitting mechanism configured to emit two or more items within the compartment 1711. The emitting mechanism may comprise a vending emitting mechanism, an auger, a belt, a motor, a pulley, or any combination thereof. In some embodiments, the compartment 1711 comprises 1, 2, 3, 4, 5, 6, 8, 10, 15, 20, 25, 30, 35, 40, 50, or more emitting mechanisms, including increments therein.

In some embodiments, each vehicle 1710 further comprises an interface configured to receive a selection of the item and to direct the item emitting mechanism to emit at least one of the items based on the selection. The interface may comprise a key, a Wi-Fi interface, a cellular interface, a Bluetooth interface, or any combination thereof. In some embodiments, the communication device 1713 is further configured to receive a selection of the item and transmit an instruction to the emitting mechanism to emit at least one of the items based on the selection. The compartment module 1733 may further allow the customer to access and remove one or more of the items from the compartment 1711 based on the customer identification. The customer may access the one or more items by opening a door, turning a knob, or any combination thereof. The customer may access the one or more items by directly removing the item.

In some embodiments, each vehicle 1710 further comprises a product detection processor configured to provide a product detection application. The product detection application may comprise a product detection module applying a product detection algorithm to the item status. The product detection module applying a product detection algorithm to the item status to detect an absence of one or more of the items. The product detection module applying a product detection algorithm to the item status to detect a presence of one or more of the items. In some embodiments, the product detection algorithm comprises a machine learning algorithm, a rule-based algorithm, or both.

The server application 1720 may comprise a data storage module 1721, a status module 1722, and a fleet management module 1723.

The data storage module 1721 may contain a plurality of locations. Each location may comprise a GPS point, a street address, a building number, an apartment number, or any combination thereof. The plurality of locations may comprise at least one inventory restocking location and a plurality of dispatch locations. The restocking location may be correlated to a warehouse comprising one or more of the items. Each dispatch location may be associated with a demand. In some embodiments, each dispatch location in the data storage module 1721 is further associated with at least one of a current customer density, a historic customer density, a time-based customer density. In some embodiments, the data storage module 1721 further contains a customer identification associated with the customer.

The status module 1722 may receive a stock indication of each of the items and a current vehicle 1710 location. The status module 1722 may receive a stock indication of each of the items and a current vehicle 1710 location from the communication device 1713 of one or more of the vehicles 1710. In some embodiments, the communication device 1713 is further configured to transmit the item status to the status module 1722. In some embodiments, the status module 1722 is further configured to receive the item status. The status module 1722 may further apply a product detection algorithm to the item status. The status module 1722 may further apply a product detection algorithm to the item status to detect an absence of one or more of the items. In some embodiments, the product detection algorithm comprises a machine learning algorithm, a rule-based algorithm, or both. In some embodiments, the status module 1722 further receives a power status associated with the energy storage device. The power status may comprise a power level percentage, a low power indicator, a fully charged indicator, or any combination thereof. The fleet management module 1723 may further direct the autonomous or semi-autonomous propulsion system 1714 of one or more of the vehicles 1710 based on the power status. The fleet management module 1723 may direct the autonomous or semi-autonomous propulsion system 1714 of one or more of the vehicles 1710 to there stocking location if the power status comprises a low power indicator, if the power level percentage is below a set power threshold, or both. The fleet management module 1723 may direct the autonomous or semi-autonomous propulsion system 1714 of one or more of the vehicles 1710 to the closest restocking location if the power status comprises a low power indicator, if the power level percentage is below a set power threshold, or both.

The fleet management module 1723 may direct the autonomous or semi-autonomous propulsion system 1714 of one or more of the vehicles 1710. The fleet management module 1723 may direct the autonomous or semi-autonomous propulsion system 1714 of one or more of the vehicles 1710 via the communication device 1713. The fleet management module 1723 may direct the autonomous or semi-autonomous propulsion system 1714 of one or more of the vehicles 1710 via the communication device 1713 to one of the plurality of dispatch locations or the inventory restocking location. The fleet management module 1723 may direct the autonomous or semi-autonomous propulsion system 1714 of one or more of the vehicles 1710 via the communication device 1713 to one of the plurality of dispatch locations or the inventory restocking location based at least on one or more of the demand, the stock indication, and the current vehicle 1710 location. The fleet management module 1723 may direct the autonomous or semi-autonomous propulsion system 1714 of one or more of the vehicles 1710 via the communication device 1713 to the inventory restocking location if the stock indication is below a set threshold. The fleet management module 1723 may direct the autonomous or semi-autonomous propulsion system 1714 of one or more of the vehicles 1710 via the communication device 1713 to the closest inventory restocking location if the stock indication is below a set threshold.

The summoning application 1730 may comprise a summon module 1731. The summon module 1731 may receive a summons from the customer. The summons may comprise at least a customer location. The customer location may comprise a GPS location, a street address, or any combination thereof. The summon module 1731 may further direct the autonomous or semi-autonomous propulsion system 1714 of one or more of the vehicles 1710. The summon module 1731 may further direct the autonomous or semi-autonomous propulsion system 1714 of one or more of the vehicles 1710 via the communication device 1713. The summon module 1731 may further direct the autonomous or semi-autonomous propulsion system 1714 of one or more of the vehicles 1710 via the communication device 1713 to the customer location. In some embodiments, the summoning processor further comprises an identification module 1732 identifying the customer. The identification module 1732 may identify the customer based at least on the input data.

In some embodiments, the summoning processor further comprises a compartment module 1733 allowing the customer to access and remove one or more of the items from the compartment 1711. In some embodiments, the summoning processor further comprises a compartment module 1733 allowing the customer to access and remove one or more of the items from the compartment 1711 based at least on the identity of the customer and the summons. In some embodiments, the summon module 1731 further receives the stock indication and displays the stock indication to the customer. In some embodiments, the summoning module allows a potential customer to summon an autonomous or semi-autonomous vehicle without the potential customer picking or ordering any items to purchase beforehand. In some embodiments, the autonomous or semi-autonomous vehicle closes the compartment after a potential customer is completed picking the products to purchase out of the autonomous or semi-autonomous vehicle. In further embodiments, the system charges the customer automatically after the picked products are removed out of the autonomous or semi-autonomous vehicles and such vehicles leave.

In some embodiments, at least one of the server application 1720 and the summoning application 1730 further comprises a payment module managing payment from the customer for the item. In some embodiments, an input device 1712 configured to receive a payment from the customer for the item.

Autonomous or Semi-Autonomous Vehicles

The plurality of autonomous or semi-autonomous vehicles may comprise 2, 3, 4, 5, 6, 8, 10, 15, 20, 25, 30, 35, 40, 50, 100, 200, 300, 500, 1,000, 5,000, 10,000 or more vehicles, including increments therein.

Each vehicle may comprise a compartment, an input device, a communication device, and an autonomous or semi-autonomous propulsion system. Each vehicle may comprise 1, 2, 3, 4, 5, 6, 8, 10, 15, 20, 25, 30, 35, 40, 50, or more compartments, including increments therein. In some embodiments, each vehicle further comprises an energy storage device configured to provide power to the autonomous or semi-autonomous propulsion system. The energy storage device may comprises a battery, a capacitor, a supercapacitor, or any combination thereof. In some embodiments, the vehicle further comprises an energy harvesting device configured to collect energy. In some embodiments, the energy harvesting device is configured to provide energy to the energy storage device.

Input Device

The input device may be configured to receive an input data. In some embodiments, the input data comprises the customer identification. The input data may correspond to a customer. The customer identification may comprise a customer name, a customer address, a customer email address, a customer identification number, a customer password, a customer image, a customer facial profile, a customer fingerprint or any combination thereof. In some embodiments, the input device comprises a button, a touchscreen, a Bluetooth sensor, a wireless network device, a cellular network device, a camera, a USB input, a keyboard, or any combination thereof. In some embodiments, the input data comprises a password, a key code, a facial recognition, a RFID recognition, a barcode recognition, a USB device input, a vocal signal, or any combination thereof. Each vehicle may comprise 1, 2, 3, 4, 5, 6, 8, 10, or more input devices. In some embodiments, the input device is on the autonomous or semi-autonomous vehicle. In additional embodiments, the input device is configured to receive signal from a user or customer cellular phone. In further embodiments, the input device is configured to connect the user or customer cellular phone with the autonomous or semi-autonomous vehicle. The input device may be configured to prevent fraud, tampering, or both. The input device may receive the customer verification from an administrator, from a registered mobile application associated with the customer, or both. The input device may be further configured to receive a payment method. The payment method may comprise a credit card slot, a mobile phone based payment method, or both.

Communication Device

The communication device may comprise a wired communication device, a Wi-Fi communication device, a Bluetooth communication device, a cellular communication device, or any combination thereof. In some embodiments, the status module receives the stock indication of each of the items and a current vehicle location from the communication device. In some embodiments, the fleet management module directs the autonomous or semi-autonomous propulsion system of one or more of the vehicles, via the communication device. In some embodiments, the summon module further directs the autonomous or semi-autonomous propulsion system of one or more of the vehicles, via the communication device.

Compartment

The compartment may be configured to contain and secure two or more of the plurality of items. The compartment may be configured to contain and secure 1, 2, 3, 4, 5, 6, 8, 10, 15, 20, 25, 30, 35, 40, 50, or more items, including increments therein. In some embodiments, the compartment comprises a sensor. In some embodiments, the compartment comprises 1, 2, 3, 4, 5, 6, 8, 10, 15, 20, 25, 30, 35, 40, 50, or more sensors, including increments therein. The sensor may be configured to detect an item status of one or more of the items. Each sensor may be configured to detect an item status of a single item. Two or more sensor may be configured to detect an item status of a single item. The item status may comprise an expired status, an available status, a presence of the item, an absence of the item, or any combination thereof. In some embodiments, the sensor comprises at least one of a thermometer, a barcode scanner, an RFID reader, a scale, a pressure sensor, a switch, and a camera. In some embodiments, the compartment comprises an item emitting mechanism configured to emit the items within the compartment. In some embodiments, each item emitting mechanism configured to emit one item within the compartment. In some embodiments, each item emitting mechanism configured to emit two or more items within the compartment. The emitting mechanism may comprise a vending emitting mechanism, an auger, a belt, a motor, a pulley, or any combination there of. In some embodiments, the compartment comprises 1, 2, 3, 4, 5, 6, 7, 8, 9, 10, 15, 20, 25, 30, 35, 40, 50, or more emitting mechanisms, including increments therein.

Interface

In some embodiments, each vehicle further comprises an interface configured to receive a selection of the item and to direct the item emitting mechanism to emit at least one of the items based on the selection. The interface may comprise a key, a Wi-Fi interface, a cellular interface, a Bluetooth interface, or any combination thereof. In some embodiments, the communication device is further configured to receive a selection of the item and transmit an instruction to the emitting mechanism to emit at least one of the items based on the selection. The compartment module may further allow the customer to access and remove one or more of the items from the compartment based on the customer identification. The customer may access the one or more items by opening a door, turning a knob, or any combination thereof. The customer may access the one or more items by directly removing the item.

Product Detection Processor

In some embodiments, each vehicle further comprises a product detection processor configured to provide a product detection application. The product detection application may comprise a product detection module applying a product detection algorithm to the item status. The product detection module applying a product detection algorithm to the item status to detect an absence of one or more of the items. The product detection module applying a product detection algorithm to the item status to detect a presence of one or more of the items. In some embodiments, the product detection algorithm comprises a machine learning algorithm, a rule-based algorithm, or both.

Data Storage Module

The server application may comprise a data storage module, a status module, and a fleet management module. The data storage module may contain a plurality of locations. Each location may comprise a GPS point, a street address, a building number, an apartment number, or any combination thereof. The plurality of locations may comprise at least one inventory restocking location and a plurality of dispatch locations. The restocking location may be correlated to a warehouse comprising one or more of the items. Each dispatch location may be associated with a demand. In some embodiments, each dispatch location in the data storage module is further associated with at least one of a current customer density, a historic customer density, a time-based customer density. In some embodiments, the data storage module further contains a customer identification associated with the customer.

Status Module

The status module may receive a stock indication of each of the items and a current vehicle location. The status module may receive a stock indication of each of the items and a current vehicle location from the communication device of one or more of the vehicles. In some embodiments, the communication device is further configured to transmit the item status to the status module. In some embodiments, the status module is further configured to receive the item status. The status module may further apply a product detection algorithm to the item status. The status module may further apply a product detection algorithm to the item status to detect an absence of one or more of the items. In some embodiments, the product detection algorithm comprises a machine learning algorithm, a rule-based algorithm, or both. In some embodiments, the status module further receives a power status associated with the energy storage device. The power status may comprise a power level percentage, a low power indicator, a fully charged indicator, or any combination thereof. The fleet management module may further direct the autonomous or semi-autonomous propulsion system of one or more of the vehicles based on the power status. The fleet management module may direct the autonomous or semi-autonomous propulsion system of one or more of the vehicles to the restocking location if the power status comprises a low power indicator, if the power level percentage is below a set power threshold, or both. The fleet management module may direct the autonomous or semi-autonomous propulsion system of one or more of the vehicles to the closest restocking location if the power status comprises a low power indicator, if the power level percentage is below a set power threshold, or both.

Fleet Management Module

The fleet management module may direct the autonomous or semi-autonomous propulsion system of one or more of the vehicles. The fleet management module may direct the autonomous or semi-autonomous propulsion system of one or more of the vehicles via the communication device. The fleet management module may direct the autonomous or semi-autonomous propulsion system of one or more of the vehicles via the communication device to one of the plurality of dispatch locations or the inventory restocking location. The fleet management module may direct the autonomous or semi-autonomous propulsion system of one or more of the vehicles via the communication device to one of the plurality of dispatch locations or the inventory restocking location based at least on one or more of the demand, the stock indication, and the current vehicle location. The fleet management module may direct the autonomous or semi-autonomous propulsion system of one or more of the vehicles via the communication device to the inventory restocking location if the stock indication is below a set threshold. The fleet management module may direct the autonomous or semi-autonomous propulsion system of one or more of the vehicles via the communication device to the closest inventory restocking location if the stock indication is below a set threshold.

Summoning Application

The summoning application may comprise a summon module. The summon module may receive a summons from the customer. The summons may comprise at least a customer location. The customer location may comprise a GPS location, a street address, or any combination thereof. The summon module may further direct the autonomous or semi-autonomous propulsion system of one or more of the vehicles. The summon module may further direct the autonomous or semi-autonomous propulsion system of one or more of the vehicles via the communication device. The summon module may further direct the autonomous or semi-autonomous propulsion system of one or more of the vehicles via the communication device to the customer location. In some embodiments, the summoning processor further comprises an identification module identifying the customer. The identification module may identify the customer based at least on the input data.

In some embodiments, the summoning processor further comprises a compartment module allowing the customer to access and remove one or more of the items from the compartment. In some embodiments, the summoning processor further comprises a compartment module allowing the customer to access and remove one or more of the items from the compartment based at least on the identity of the customer and the summons. In some embodiments, the summon module further receives the stock indication and displays the stock indication to the customer.

In some embodiments, at least one of the server application and the summoning application further comprises a payment module managing payment from the customer for the item. In some embodiments, an input device configured to receive a payment from the customer for the item.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-In

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash®Player, Microsoft® Silverlight®, and Apple® QuickTime®.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for autonomous vehicles. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

Terms and Definitions

As used herein, the terms "fleet," "sub-fleet," and like terms are used to indicate a number of land vehicles, watercraft, or aircraft operating together or under the same ownership. In some embodiments the fleet or sub-fleet is engaged in the same activity. In some embodiments, the fleet or sub-fleet are engaged in similar activities. In some embodiments, the fleet, or sub-fleet are engaged in different activities.

As used herein, the terms "autonomous vehicle," "autonomous vehicle fleet," "vehicle," "all-terrain vehicle," and like terms are used to indicate a mobile machine that transports cargo. Typical vehicles include cars, wagons, vans, unmanned motor vehicles (e.g., tricycles, trucks, trailers, buses, etc.), unmanned railed vehicles (e.g., trains, trams, etc.), unmanned watercraft (e.g., ships, boats, ferries, landing craft, barges, rafts, etc.), aerial drones, unmanned hovercraft (air, land and water types), unmanned aircraft, and even including unmanned spacecraft.

As used herein, the terms "user," "operator," "fleet operator," and like terms are used to indicate the entity that owns or is responsible for managing and operating the autonomous vehicle fleet.

As used herein, the term "customer" and like terms are used to indicate the entity that requests the services provided the autonomous vehicle fleet.

As used herein, the terms "provider," "business," "vendor," "third party vendor," and like terms are used to indicate an entity that works in concert with the fleet owner or operator to utilize the services of the autonomous vehicle fleet to deliver the provider's product from and or return the provider's product to the provider's place of business or staging location.

As used herein, the terms "server," "computer server," "central server," "main server," and like terms are used to indicate a computer or device on a network that manages the fleet resources, namely the autonomous vehicles.

As used herein, the term "controller" and like terms are used to indicate a device that controls the transfer of data from a computer to a peripheral device and vice versa. For example, disk drives, display screens, keyboards, and printers all require controllers. In personal computers, the controllers are often single chips. As used herein the controller is commonly used for managing access to components of the autonomous vehicle such as the securable compartments.

As used herein a "mesh network" is a network topology in which each node relays data for the network. All mesh nodes cooperate in the distribution of data in the network. It can be applied to both wired and wireless networks. Wireless mesh networks can be considered a type of "Wireless adhoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

As used herein, the term "module" and like terms are used to indicate a self-contained hardware component of the central server, which in turn comprises software modules. In software, a module is a part of a program. Programs are composed of one or more independently developed modules that are not combined until the program is linked. A single module can contain one or several routines, or sections of programs that perform a particular task. As used herein the fleet management module comprises software modules for managing various aspects and functions of the autonomous vehicle fleet.

As used herein, the terms "processor," "digital processing device," and like terms are used to indicate a microprocessor or central processing unit (CPU). The CPU is the electronic circuitry within a computer that carries out the instructions of a computer program by performing the basic arithmetic, logical, control and input/output (I/O) operations specified by the instructions.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatus used to store data or programs on a temporary or permanent basis. In some embodiments, the device is volatile memory and requires power to maintain stored information. In some embodiments, the device is non-volatile memory and retains stored information when the digital processing device is not powered. In some embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In some embodiments, the device is a storage device including, by way of non-limiting examples, CD-ROMs, DVDs, flash memory devices, magnetic disk drives, magnetic tapes drives, optical disk drives, and cloud computing based storage. In some embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In some embodiments, the display is a thin film transistor liquid crystal display (TFT-LCD). In some embodiments, the display is an organic light emitting diode (OLED) display. In various some embodiments, on OLED display is a passive-matrix OLED (PMOLED) or active-matrix OLED (AMOLED) display. In some embodiments, the display is a plasma display. In some embodiments, the display is a video projector. In some embodiments, the display is interactive (e.g., having a touch screen or a sensor such as a camera, a 3D sensor, a LiDAR, a radar, etc.) that can detect user interactions/gestures/responses and the like. In still some embodiments, the display is a combination of devices such as those disclosed herein.

The invention claimed is:

1. A method of providing an autonomous service, the method comprising:
   receiving, from a first device of a first customer, an order request for the autonomous service, the order request corresponding to a request for a purchase of one or more items;
   receiving, from a second device of a second customer, a summon request for the autonomous service, the summon request corresponding to a request to rendezvous with an autonomous vehicle without purchasing any items prior to the autonomous vehicle rendezvousing with the second customer;
   in response to receiving the order request of the first customer and the summon request of the second customer, directing the autonomous vehicle to a first location of the first customer and to a second location of the second customer, the autonomous vehicle including a plurality of compartments including a first compartment for storing the one or more items purchased by the first customer and a second compartment for storing a plurality of items for display to the second customer; and
   causing, based on identification of the first customer, the first compartment to open to enable the first customer to retrieve the one or more items purchased by the first customer and causing, based on identification of the second customer, the second compartment to open to enable the second customer to view and purchase at least one of the plurality of items for display to the second customer.

2. The method of claim 1, further comprising:
   in response to receiving the summon request of the second customer, obtaining a stock indication of each of the plurality of items for display to the second customer and displaying the stock indication of each of the plurality of items to the second customer.

3. The method of claim 1, further comprising:
   receiving a first input from the first customer and identifying the first customer based at least on the first input; and
   receiving a second input from the second customer and identifying the second customer based at least on the second input.

4. The method of claim 1, wherein the first compartment includes a first sensor configured to detect presence of one or more items within the first compartment and wherein the second compartment includes a second sensor configured to detect presence of one or more items within the second compartment.

5. The method of claim 1, wherein the autonomous vehicle comprises an interface configured to receive a selection of one or more items from the plurality of items for purchase by the second customer.

6. The method of claim 1, further comprising:
   maintaining, in a data storage module, a plurality of locations comprising at least one inventory restocking location and a plurality of dispatch locations, wherein each dispatch location is associated with a demand for the autonomous service.

7. The method of claim 6, wherein each dispatch location in the data storage module is associated with the demand, and is further associated with at least one of a current customer density, a historic customer density, a time-based customer density.

8. The method of claim 1, further comprising:
   obtaining a power status of the autonomous vehicle; and
   directing the autonomous vehicle based on the power status of the autonomous vehicle.

9. The method of claim 8, wherein directing the autonomous vehicle based on the power status of the autonomous vehicle comprises directing the autonomous vehicle to an inventory restocking location in response to the power status indicating low power.

10. The method of claim 1, wherein each of the plurality of compartments is separately securable.

11. A platform for providing an autonomous service, the platform comprising:
   (a) a plurality of autonomous vehicles, each vehicle comprising:
      a plurality of compartments configured to contain and secure one or more items;
      an input device configured to receive input data corresponding to a customer;
      a communication device; and
      an autonomous propulsion system;
   (b) one or more servers configured to perform functions including:
      receiving, from a first device of a first customer, an order request for the autonomous service, the order request corresponding to a request for a purchase of one or more items;
      receiving, from a second device of a second customer, a summon request for the autonomous service, the summon request corresponding to a request to rendezvous with one of the plurality of autonomous vehicles without purchasing any items prior to the one of the plurality of autonomous vehicles rendezvousing with the second customer;
      in response to receiving the order request of the first customer and the summon request of the second customer, directing a first autonomous vehicle of the plurality of autonomous vehicles to a first location of the first customer and to a second location of the second customer, a first compartment of the first autonomous vehicle storing the one or more items purchased by the first customer and a second compartment of the first autonomous vehicle storing a plurality of items for display to the second customer; and causing, based on identification of the first customer, the first compartment to open to enable the first customer to retrieve the one or more items purchased by the first customer and causing, based on identification of the second customer, the second compartment to open to enable the second customer to view and purchase at least one of the plurality of items for display to the second customer.

12. The platform of claim 11, wherein each compartment of the plurality of compartments of each vehicle includes a sensor configured to detect an item status of the one or more items stored in the each compartment.

13. The platform of claim 12, wherein the sensor comprises at least one of a thermometer, a barcode scanner, an RFID reader, a scale, a pressure sensor, a switch, and a camera.

14. The platform of claim 12, wherein the item status includes at least one of an availability, a presence, or an absence of the one or more items.

15. The platform of claim 11, wherein the communication device is configured to receive a selection of an item input device is configured to receive a payment from the customer for the item.

16. The platform of claim 11, wherein the input data comprises at least one of a password, a key code, a facial recognition, a RFID recognition, a barcode recognition, a USB device input, and a vocal signal.

17. The platform of claim 11, wherein each vehicle further comprises an energy storage device configured to provide power to the autonomous propulsion system.

18. The platform of claim 11, wherein the one or more servers are further configured to perform functions including:
   in response to receiving the summon request of the second customer, obtaining a stock indication of each of the plurality of items for display to the second customer and displaying the stock indication of each of the plurality of items to the second customer; and
   wherein each dispatch location in the data storage module is associated with the demand, and is further associated with at least one of a current customer density, a historic customer density, a time-based customer density.

19. The platform of claim 11, wherein the one or more servers are further configured to perform functions including:
   maintaining, in a data storage module, a plurality of locations comprising at least one inventory restocking location and a plurality of dispatch locations, wherein each dispatch location is associated with a demand for the autonomous service;
   obtaining a power status of the autonomous vehicle; and
   directing the autonomous vehicle to the at least one inventory restocking location in response to the power status indicating low power.

20. The platform of claim 11, wherein each of the plurality of compartments is separately securable.

* * * * *